US006532199B1

(12) United States Patent
Getreuer et al.

(10) Patent No.: US 6,532,199 B1
(45) Date of Patent: Mar. 11, 2003

(54) OPTICAL ACTUATOR ASSEMBLY WITH LENS POSITION SENSOR FOR RECORDING OR PLAYBACK

(75) Inventors: Kurt W. Getreuer, Colorado Springs, CO (US); Leonardus J. Grassens, Chipita Park, CO (US)

(73) Assignee: Discovision Associates, Irvine, CA (US)

( * ) Notice: Subject to any disclaimer, the term of this patent is extended or adjusted under 35 U.S.C. 154(b) by 58 days.

(21) Appl. No.: 09/654,971

(22) Filed: Sep. 5, 2000

Related U.S. Application Data

(63) Continuation of application No. 08/907,267, filed on Aug. 6, 1997, now Pat. No. 6,141,300, which is a continuation of application No. 08/482,582, filed on Jun. 7, 1995, now abandoned, which is a division of application No. 08/399,268, filed on Mar. 6, 1995, now Pat. No. 5,532,989, which is a continuation of application No. 08/105,866, filed on Aug. 11, 1993, now abandoned, which is a continuation of application No. 07/657,155, filed on Feb. 15, 1991, now Pat. No. 5,265,079.

(51) Int. Cl.[7] .................................................. G11B 7/00

(52) U.S. Cl. .................................. 369/44.14; 369/44.22

(58) Field of Search ........................... 369/44.14, 44.15, 369/44.21, 44.22, 219, 249, 256, 44.16; 359/813, 814, 823, 824

(56) References Cited

U.S. PATENT DOCUMENTS

| 2,432,432 A | 12/1947 | MacNeille |
| 3,310,792 A | 3/1967 | Groom et al. |
| 3,518,442 A | 6/1970 | Johnson |
| 3,530,258 A | 9/1970 | Gregg et al. |
| 3,536,375 A | 10/1970 | Mansell et al. |
| 3,637,984 A | 1/1972 | Irvine |

(List continued on next page.)

FOREIGN PATENT DOCUMENTS

| BR | 7900180 | 4/1984 |
| CA | 833100 | 1/1970 |

(List continued on next page.)

OTHER PUBLICATIONS

Cellucci, Thomas A., "Matching Performance Requirements with Technology: An Applications Approach to Vibration Isolation" SPIE, vol. 1619 Vibration Control in Microelectronics, Optics, and Metrology, 1991, pp. 2–10.

Crooks, et al., "Uniformity of Radial and Circumferential Orientation Ratio of Particulate Disks", SPIE, vol. 1248 Storage and Retrieval Systems and Applications, 1990, pp. 133–139.

de Haan et al., "Design Considerations of An Optical Digital Data Storage Drive", Topical Meeting on Optical Data Storage, Apt. 1984, pp. WC–A5–1–WC–A5–6.

Dinsdale, J., "Precision Engineering Aspects of Record Player Design", Precision Engineering, vol. 5, No. 4, Oct. 1983, pp. 185–193.

Eventoff, Arnold T., "Improved Philips Air Sandwich Disk", Optical Storage Media 1983, pp. 150–159.

(List continued on next page.)

*Primary Examiner*—Thang V. Tran
(74) *Attorney, Agent, or Firm*—Keiji Masaki; Steve A. Wong; Caroline T. Do

(57) ABSTRACT

An apparatus for optical reading or recording information on an optical disc is rotatable about an axis of rotation. The apparatus includes a carriage, an objective lens, and an objective lens holder. The carriage has a center of mass. The carriage is movable relative to a frame along a path radial to the axis of rotation. The objective lens has an optical axis. The object lens is mounted to the objective holder so that the optical axis of the objective lens is within a first distance of intersecting the center of mass of the carriage. The holder is movable relative to the carriage so as to move the objective lens along its optical axis.

24 Claims, 27 Drawing Sheets

U.S. PATENT DOCUMENTS

| | | |
|---|---|---|
| 3,652,167 A | 3/1972 | Smith |
| 3,677,621 A | 7/1972 | Smith |
| 3,806,668 A | 4/1974 | Hiliker |
| 3,931,641 A | 1/1976 | Watrous |
| 3,997,715 A | 12/1976 | Elliott |
| 4,059,841 A | 11/1977 | Bricot et al. |
| 4,118,735 A | 10/1978 | Wilkinson |
| 4,120,504 A | 10/1978 | Brecht |
| 4,160,156 A | 7/1979 | Sherer |
| 4,161,753 A | 7/1979 | Bailey et al. |
| 4,190,860 A | 2/1980 | Somers et al. |
| 4,204,199 A | 5/1980 | Isailovic |
| 4,210,931 A | 7/1980 | Bailey et al. |
| 4,222,072 A | 9/1980 | Bailey et al. |
| 4,225,873 A | 9/1980 | Winslow |
| 4,228,326 A | 10/1980 | Dakin et al. |
| 4,232,201 A | 11/1980 | Canino |
| 4,232,337 A | 11/1980 | Winslow et al. |
| 4,232,388 A | 11/1980 | Isailovic |
| 4,234,837 A | 11/1980 | Winslow |
| 4,236,050 A | 11/1980 | Winslow et al. |
| 4,236,105 A | 11/1980 | Wilkinson |
| 4,271,334 A | 6/1981 | Yardy |
| 4,282,598 A | 8/1981 | Elliott |
| 4,307,381 A | 12/1981 | Isailovic |
| 4,313,191 A | 1/1982 | Winslow et al. |
| 4,353,909 A | 10/1982 | Broadbent |
| 4,358,796 A | 11/1982 | Ceshkovsky et al. |
| 4,370,679 A | 1/1983 | Ceshkovsky et al. |
| 4,371,899 A | 2/1983 | Ceshkovsky et al. |
| 4,375,091 A | 2/1983 | Dakin et al. |
| 4,406,000 A | 9/1983 | Shoji et al. |
| 4,414,655 A | 11/1983 | Shoji et al. |
| 4,425,043 A | 1/1984 | Van Rosmalen |
| 4,439,848 A | 3/1984 | Ceshkovsky et al. |
| 4,447,722 A | 5/1984 | Saimi |
| 4,449,213 A | 5/1984 | Noborimoto et al. |
| 4,451,913 A | 5/1984 | Elliott |
| 4,455,634 A | 6/1984 | Efron et al. |
| 4,456,914 A | 6/1984 | Winslow |
| 4,465,977 A | 8/1984 | Lopez De Romana |
| 4,466,034 A | 8/1984 | Newberry |
| 4,467,467 A | 8/1984 | Wilkinson et al. |
| 4,488,279 A | 12/1984 | Wilkinson et al. |
| 4,497,534 A | 2/1985 | Sincerbox |
| 4,499,569 A | 2/1985 | Lopez De Romana |
| 4,502,783 A | 3/1985 | Lau et al. |
| 4,504,935 A | 3/1985 | Jansen |
| 4,514,837 A | 4/1985 | Van Rosmalen |
| 4,524,444 A | 6/1985 | Efron et al. |
| 4,536,863 A | 8/1985 | Giddings |
| 4,542,429 A | 9/1985 | Nishida et al. |
| 4,554,653 A * | 11/1985 | Malissin et al. ......... 369/44.16 |
| RE32,051 E | 12/1985 | Ceshkovsky et al. |
| 4,561,081 A | 12/1985 | Janssen et al. |
| 4,562,577 A | 12/1985 | Glover et al. |
| 4,568,142 A | 2/1986 | Iguma |
| 4,571,026 A | 2/1986 | Mauria |
| 4,571,716 A | 2/1986 | Szerlip |
| 4,583,210 A | 4/1986 | Winslow |
| 4,592,037 A | 5/1986 | Ohnuki |
| 4,596,444 A | 6/1986 | Ushida |
| 4,596,448 A | 6/1986 | Kikuchi |
| 4,598,324 A | 7/1986 | Efron et al. |
| 4,603,363 A | 7/1986 | Rickert et al. |
| 4,603,412 A | 7/1986 | Yamazaki |
| 4,607,913 A | 8/1986 | Jansen |
| 4,611,318 A | 9/1986 | Winslow |
| 4,616,355 A | 10/1986 | Kasahara |
| 4,623,837 A | 11/1986 | Efron |
| 4,627,038 A | 12/1986 | Abed et al. |
| 4,633,471 A | 12/1986 | Perera et al. |
| 4,638,377 A | 1/1987 | Dakin |
| 4,643,522 A | 2/1987 | Takashima |
| 4,644,516 A | 2/1987 | Musha |
| 4,646,283 A | 2/1987 | Ito et al. |
| 4,669,073 A | 5/1987 | Wakabayashi et al. |
| RE32,431 E | 6/1987 | Dakin et al. |
| 4,677,605 A | 6/1987 | Abed |
| 4,679,904 A | 7/1987 | Kurihara |
| 4,682,246 A | 7/1987 | Efron et al. |
| 4,688,204 A | 8/1987 | Noyes, Jr. et al. |
| 4,694,447 A | 9/1987 | Cohen et al. |
| 4,696,566 A | 9/1987 | Sekimoto et al. |
| 4,697,167 A | 9/1987 | O'Keeffe et al. |
| 4,701,898 A | 10/1987 | Giddings |
| 4,702,555 A | 10/1987 | Iguna et al. |
| 4,703,368 A | 10/1987 | Dakin |
| 4,703,467 A | 10/1987 | Elliott |
| 4,703,470 A | 10/1987 | Castagna et al. |
| 4,706,133 A | 11/1987 | Giddings |
| RE32,574 E | 1/1988 | Ceshovsky et al. |
| 4,720,088 A | 1/1988 | Tamura |
| 4,727,433 A | 2/1988 | Dakin |
| 4,727,532 A | 2/1988 | Giddings |
| 4,740,941 A | 4/1988 | Shah et al. |
| 4,740,946 A | 4/1988 | Yamura et al. |
| 4,746,991 A | 5/1988 | Efron et al. |
| 4,750,065 A | 6/1988 | Masaki et al. |
| 4,751,692 A | 6/1988 | Giddings |
| 4,752,954 A | 6/1988 | Masuko |
| RE32,709 E | 7/1988 | Ceshovsky et al. |
| 4,755,884 A | 7/1988 | Efron et al. |
| 4,757,393 A | 7/1988 | Dakin et al. |
| 4,759,005 A | 7/1988 | Kasahara |
| 4,763,334 A | 8/1988 | McCaslin et al. |
| 4,764,915 A | 8/1988 | Efron et al. |
| 4,766,583 A | 8/1988 | Oinoue et al. |
| 4,769,803 A | 9/1988 | Yamamiya |
| 4,774,699 A | 9/1988 | Giddings |
| 4,786,999 A | 11/1988 | Tanaka et al. |
| 4,791,622 A | 12/1988 | Clay et al. |
| 4,792,875 A | 12/1988 | Ohdaira |
| 4,794,586 A | 12/1988 | Korth |
| 4,797,763 A | 1/1989 | Levy et al. |
| 4,805,162 A | 2/1989 | Stahl et al. |
| 4,809,247 A | 2/1989 | Elliott |
| 4,811,320 A | 3/1989 | Kawasaki et al. |
| 4,823,336 A | 4/1989 | Inada et al. |
| 4,825,432 A | 4/1989 | Takahashi |
| 4,829,395 A | 5/1989 | Coon et al. |
| 4,842,392 A | 6/1989 | Nakamura et al. |
| 4,845,697 A | 7/1989 | Giddings |
| 4,845,699 A | 7/1989 | Kawasaki et al. |
| 4,849,952 A | 7/1989 | Shiho |
| 4,853,811 A | 8/1989 | Brooks |
| 4,864,444 A | 9/1989 | Liu et al. |
| 4,866,687 A | 9/1989 | Kasai et al. |
| 4,868,694 A | 9/1989 | Hagen |
| 4,870,703 A | 9/1989 | Augeri et al. |
| 4,878,211 A | 10/1989 | Suzuki et al. |
| 4,882,644 A | 11/1989 | Kimura et al. |
| 4,912,583 A | 3/1990 | Hinlein |
| 4,942,563 A | 7/1990 | Yamamuro |
| 4,942,564 A | 7/1990 | Hofer et al. |
| 4,945,526 A | 7/1990 | Jansen et al. |
| 4,948,230 A | 8/1990 | Kasahara et al. |
| 4,953,959 A | 9/1990 | Ishiwata et al. |
| 4,960,321 A | 10/1990 | Takahashi |
| 4,974,222 A | 11/1990 | Ishitoya et al. |
| 4,979,158 A | 12/1990 | Yoda |

| | | |
|---|---|---|
| 4,980,787 A | 12/1990 | Iwanaga |
| 4,988,165 A | 1/1991 | Ishii et al. |
| 4,998,011 A | 3/1991 | Shuman |
| 5,001,568 A | 3/1991 | Efron et al. |
| 5,003,524 A | 3/1991 | Ukeda |
| 5,003,526 A | 3/1991 | Bailey |
| 5,004,901 A | 4/1991 | Yoshimoto et al. |
| 5,010,538 A | 4/1991 | Takeda et al. |
| 5,025,335 A | 6/1991 | Stefansky |
| 5,044,729 A | 9/1991 | Tomita et al. |
| 5,079,757 A | 1/1992 | Wachi et al. |
| 5,084,852 A | 1/1992 | Bailey |
| 5,103,438 A | 4/1992 | Masunaga et al. |
| 5,124,967 A | 6/1992 | Isaka et al. |
| 5,124,971 A | 6/1992 | Nomura et al. |
| 5,126,983 A | 6/1992 | Ikegame et al. |
| 5,126,990 A | 6/1992 | Efron et al. |
| 5,128,911 A | 7/1992 | Ito et al. |
| 5,130,854 A | 7/1992 | Suzuki |
| 5,136,558 A | 8/1992 | Getreuer et al. |
| 5,136,560 A | 8/1992 | Hangai et al. |
| 5,138,605 A | 8/1992 | Shtipelman et al. |
| 5,146,443 A | 9/1992 | Iwase et al. |
| 5,150,343 A | 9/1992 | Goto et al. |
| 5,155,633 A | 10/1992 | Grove et al. |
| 5,165,088 A | 11/1992 | Suzuki et al. |
| 5,175,716 A | 12/1992 | Min |
| 5,175,719 A | 12/1992 | Imura |
| 5,177,640 A | 1/1993 | Grassens |
| 5,177,717 A | 1/1993 | Sato et al. |
| 5,187,627 A | 2/1993 | Hickox et al. |
| 5,187,702 A | 2/1993 | Takahashi |
| 5,189,653 A | 2/1993 | Yanagi |
| 5,191,570 A | 3/1993 | Shirai |
| 5,200,935 A | 4/1993 | Watanabe et al. |
| 5,208,703 A | 5/1993 | Ikegame et al. |
| 5,216,647 A | 6/1993 | Kitani |
| 5,218,587 A * | 6/1993 | Nomiyama et al. ...... 369/44.15 |
| 5,220,543 A | 6/1993 | Kuroda et al. |
| 5,241,524 A | 8/1993 | Lee |
| 5,245,174 A | 9/1993 | Prikyl et al. |
| 5,253,244 A | 10/1993 | Bailey |
| 5,262,913 A | 11/1993 | Stram et al. |
| 5,265,079 A * | 11/1993 | Getreuer et al. ......... 369/44.14 |
| 5,268,800 A | 12/1993 | Nielsen |
| 5,291,110 A | 3/1994 | Andrews, Jr. et al. |
| 5,313,332 A | 5/1994 | Schell et al. |
| 5,317,143 A | 5/1994 | Yoshimoto et al. |
| 5,317,552 A | 5/1994 | Yamasaki |
| 5,319,624 A | 6/1994 | Yamasaki et al. |
| 5,321,680 A | 6/1994 | Bailey |
| 5,325,247 A | 6/1994 | Ehrlich et al. |
| 5,331,622 A | 7/1994 | Ernst et al. |
| 5,347,500 A | 9/1994 | Eguchi |
| 5,349,175 A | 9/1994 | Prikyl |
| 5,361,175 A | 11/1994 | Richardson et al. |
| 5,361,242 A | 11/1994 | Chaya et al. |
| 5,361,247 A | 11/1994 | Fuji et al. |
| 5,365,389 A | 11/1994 | Jabbari et al. |
| 5,373,490 A | 12/1994 | Bailey |
| 5,375,116 A | 12/1994 | Bailey |
| 5,398,222 A | 3/1995 | Kim |
| 5,412,522 A | 5/1995 | Lockhart et al. |
| 5,448,537 A | 9/1995 | Tsukahara et al. |
| 5,448,545 A | 9/1995 | Bailey |
| 5,455,728 A | 10/1995 | Edwards et al. |
| 5,459,624 A | 10/1995 | Erickson et al. |
| 5,469,414 A | 11/1995 | Okamura |
| 5,479,390 A | 12/1995 | Bailey |
| 5,493,546 A | 2/1996 | Kasahara |
| 5,495,465 A | 2/1996 | Arisaka |
| 5,502,700 A | 3/1996 | Shinada |
| 5,532,989 A | 7/1996 | Getreuer et al. |
| 5,541,899 A | 7/1996 | Kume et al. |
| 5,576,909 A | 11/1996 | Dierkes et al. |

FOREIGN PATENT DOCUMENTS

| | | |
|---|---|---|
| CA | 1013854 | 7/1977 |
| CA | 1125434 | 6/1982 |
| CA | 1145464 | 4/1983 |
| DE | 3714026 | 11/1988 |
| EP | 118626 | 9/1984 |
| EP | 212941 | 3/1987 |
| EP | 233313 | 8/1987 |
| EP | 2-282288 | 9/1988 |
| EP | 287235 | 10/1988 |
| EP | 2-304932 | 3/1989 |
| EP | 2-313818 | 5/1989 |
| EP | 343979 | 11/1989 |
| EP | 393915 | 10/1990 |
| EP | 407215 | 1/1991 |
| EP | 427302 | 5/1991 |
| EP | 456454 | 11/1991 |
| EP | 458319 | 11/1991 |
| EP | 543707 | 5/1993 |
| EP | 554125 | 8/1993 |
| EP | 568009 | 11/1993 |
| EP | 586185 | 3/1994 |
| EP | 618569 | 10/1994 |
| FR | 2595857 | 9/1987 |
| GB | 2779492 | 1/1995 |
| JP | 57-18037 | 1/1982 |
| JP | 57-48709 | 3/1982 |
| JP | 58-64649 | 4/1983 |
| JP | 60-115031 | 6/1985 |
| JP | 129937 | 7/1985 |
| JP | 60-219640 | 11/1985 |
| JP | 60-247854 | 12/1985 |
| JP | 61-17230 | 1/1986 |
| JP | 61-182642 | 8/1986 |
| JP | 61-248241 | 11/1986 |
| JP | 62-205540 | 9/1987 |
| JP | 0282938 | 11/1988 |
| JP | 1173475 | 7/1989 |
| JP | 1628236 | 11/1990 |
| JP | 1670392 | 6/1991 |
| JP | 5325294 | 12/1993 |
| JP | 6-223389 | 8/1994 |
| JP | 6342526 | 12/1994 |
| KR | 92-25208 | 12/1992 |
| WO | 8403985 | 10/1984 |
| WO | 910774 | 5/1991 |

OTHER PUBLICATIONS

Fukui, et al., "Dynamic Characteristics of Flying–Head Sliders on Running Way Disk", Tribology and Mechanics of Magnetic Storage Systems, 1984, pp. 52–58.

Fukui, et al., "A New Servo Method with Eccentricity Correction Circuit", SPIE vol. 695 Optical Mass Data Storage II, 1986, 147–152.

Good et al., The Finite Element Modeling of the Free Vibration of a Read–Write Head Floppy Disk System, Journal of Vibration, Acoustics, Stress, and Reliability in Design, vol. 107, Jul. 1985, pp. 329–333.

Harrison, et al., "Non–Repeatable Runout of Cantilever and Doubly Supported 5–114 Disc Drive Spindles", Precision Engineering, vol. 13, No. 1, Jan. 1991, pp. 33–40.

Hildebrandt, G., "A New Video Signal Processor for High-End Professional Laservision/CD Video Players", IEEE Transactions on Consumer Electronics, vol. 34, No. 3, Aug. 1988, pp. 566–570.

Hoogeveen, et al., "Flatness Characteristics of Media for Optical Recording", Optical Storage Media, 1983, pp. 144–149.

Hsieh, et al., "Optical Disk Servo Control System", SPIE vol. 329 Optical Disk Technology, 1982, pp. 81–88.

Ichiyama, et al., "A Disk Handling System and Optical Disk Jukebox Storage", SPIE vol. 529, Optical Mass Data Storage, 1985, pp. 89–94.

Isailovic, Jordan, "Videodisk and Optical Memory Systems", 1985, Fundamentals of Optics, Ch. 5, pp. 191–195.

Katoh, et al., "High-speed Servo Technology for Optical Disk Drive", SPIE vol. 899 Optical Storage Technology and Applications, 1988, pp. 24–30.

Levene, M.L., "Optical Disk Media Parameters and Their Relationships to Equipment Design", Optical Storage Media, 1983, pp. 273–281.

Martinek, Stephen J., "Accurate Laboratory Boresight Alignment of Transmitter/Receiver Optical Axes", SPIE vol. 608 Optical Alignment III, 1986, pp. 80–86.

Morimoto, Y. et al., "Transversal Push-pull Method for Optical Pickup", IEEE Transactions on Consumer Electronics, vol. 35, No. 4, Nov. 1989, pp. 810–813.

Murakami, et al., "Optical Disk Memory System", SPIE vol. 329, Optical Disk Technology, 1982, pp. 25–32.

Ohta, et al., "Vibration Reduction of Magnetic Disk Drive Mechanism", Bulletin of JSME, vol. 28, No. 241, Jul. 1985, pp. 1489–1496.

Poulsen, et al., "Inspection of Axially Symmetric Parts", SPIE vol. 60, 1975, pp. 91–97.

Robinson, et al., "The Accurate Measurement of Small Rotations by Modulating Polarization", SPIE vol. 608 Optical Alignment III, 1986, pp. 87–92.

Sommargren, G.E., "An Optical Measurement of Surface Profile", Precision Engineering, 1981, pp. 131–136.

Tanaka, et al., "High Speed Accessing Magnetic–Optical Disk Drive", SPIE vol. 899 Optical Storage Technology and Applications, 1988, pp. 8–15.

Thompson, Kevin P., "Techniques for Characterizing Optical System Fabrication", SPIE vol. 483 Optical Alignment II, 1984, pp. 16–22.

Tsukamoto, et al., "A Holographic Information Retrieval System", topical Meeting on Optical of digital Data, Optical Society of America, 1973, pp. WB2.1–WB2.4.

Tsunoda, et al., "Optical Digital Data Storage Technologies with Semiconductor Laser Head", SPIE vol. 382 Optical Data Storage, Jan. 1983, pp. 24–31.

Yanabe, et al., "Rotor Axial Vibration Caused by Gear Coupling", Bulletin of JSME, vol. 28, No. 241, Jul. 1985, pp. 1497–1504.

Yoshida, et al., "3.5 Inch 16 MBYTE Floppy Disk Drive", IEEE Transactions on Consumer Electronics, vol. 35, No. 3, Aug. 1989, pp. 672–680.

Yoshizumi, Keiichi et al., "Fast Access Actuator for Optical Disk Memory", 1985, Topical Meeting on Optical Data Storage—Digest of Technical Papers, pp. THAA5-2-THAA5-4.

Marchant, Alan B., "Optical Recording: A Technical Overview", 1990, Addison–Wesley, Reading Massachusetts XP002093189 19056 "The servo loop", pp. 181–188.

Hartmann, M., "Erasable Magneto–Optical Recording Media", IEEE Transactions on Magnetics, vol. Mag–20, No. 5, Sep. 1984, pp. 1013–1018.

Sander, I., "Digital Magneto–Optic Storage System", Topical Meeting on Optical Data Storage, pp. Tha2–1–Tha2–4.

Murakami, et al., "Magnetotropic erasable disk memory with two optical heads", Applied Optics, vol. 25, No. 22, Nov. 15, 1986, pp. 3986–3989.

Yoshizumi, Keiichi, et al., *Fast Access Actuator for Optical Disk Memory*.

G. Bouwhuis, et al., *Principals of Optical Disk Systems*, Adam Hilger Ltd., Bristol, pp. 70–80.

Kabori, et al., "New Magneto–Optic Head with a Built–In Generator for a Bias Magnetic Field", Optical Data Storage Conference, Technical Digest Series vol. 10, Mar. 11–13, 1987, pp. 186–189.

Hiromichi Kobori et al., "New magnetopitc head with a built–in generator for a bias magnetic field", Applied Optics, vol. 27, No. 4, Feb. 15, 1988, pp. 698–702.

Eguchi, Naoya, et al., An 86 mm Magneto–Optical Disk Drive with a Compact and fast–seek–time Optical head, SPIE vol. 1316 Optical Data Storage (1990), pp. 2–10.

T. Maeda, et al., Read Channel and Format for High Density Magneto–Optical Disk System, Joint International Symposium, 1993 IEEE Catalog #93TH0548–8, pp. 59, 60.

H. Ide, et al., Write Control Method for High Density Magneto–Optical Disk System, Joint International Symposium 1993 IEEE Catalog #93TH0548–8, pp. 61, 62.

Takeshi Maeda et al., Read Channel and Format for High–Density Magneto–Optical Disk System, Jpn. J. Appl. Phys. Nov. 1993, vol. 32, pp. 5335–5341.

T. Maeda et al., Write Control Method for High Density Magneto–optical Disk System, IEEE Transactions on Magnetics, vol. 29, No. 6, Nov. 1993, pp. 3787–3789.

* cited by examiner

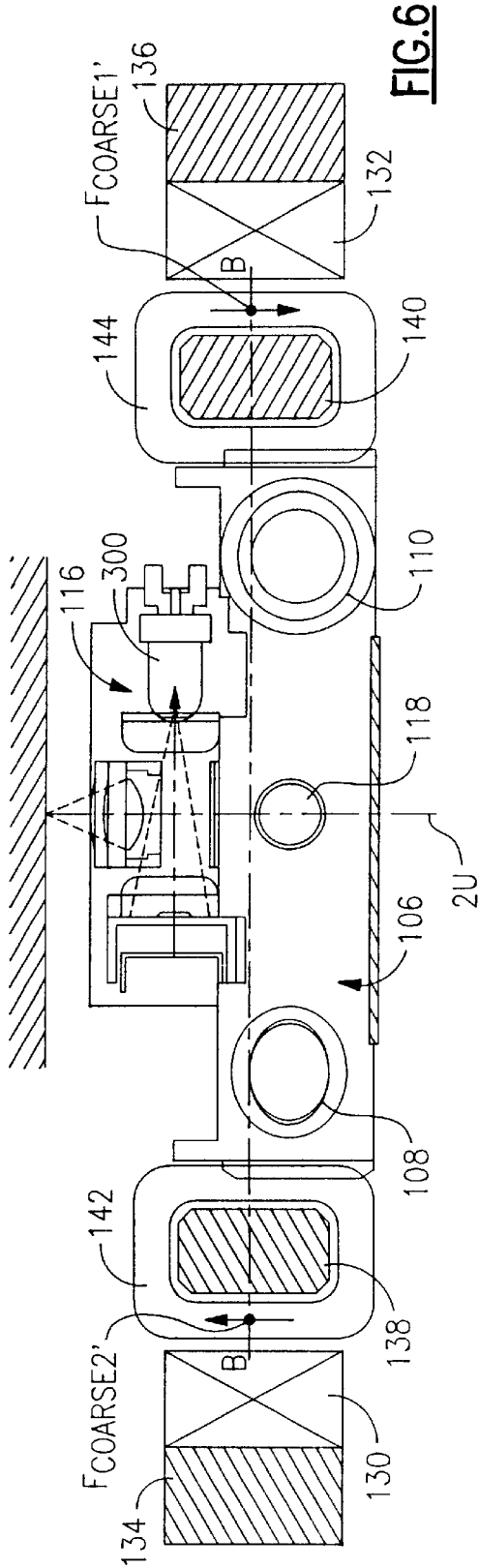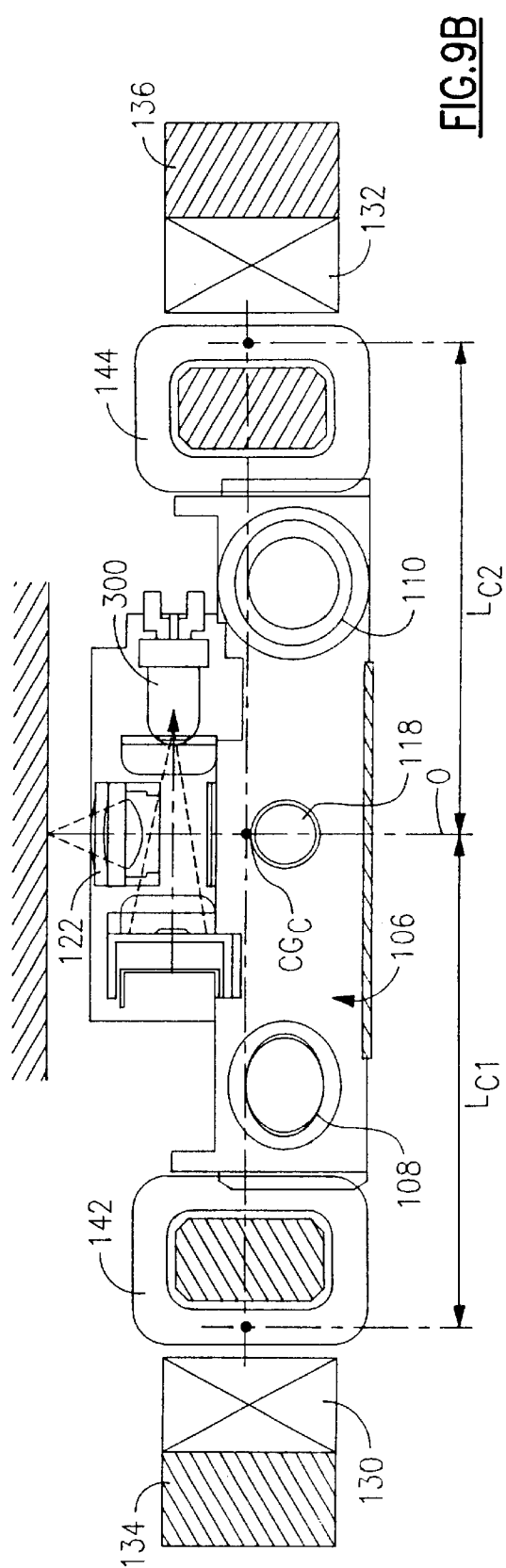

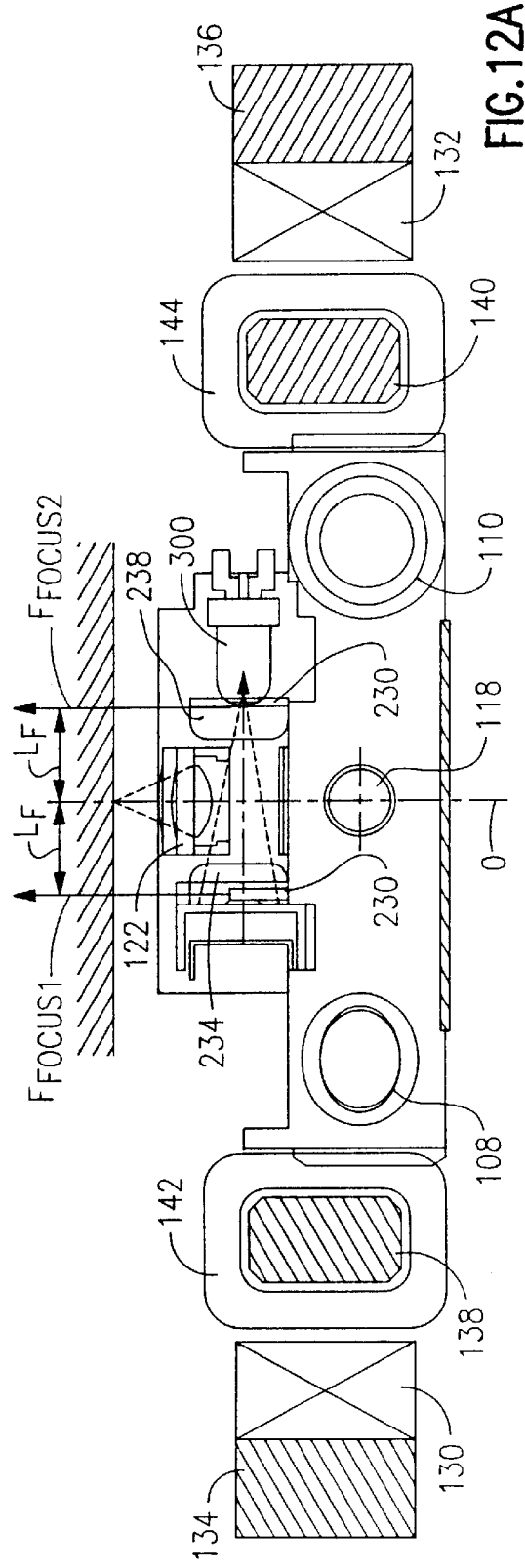
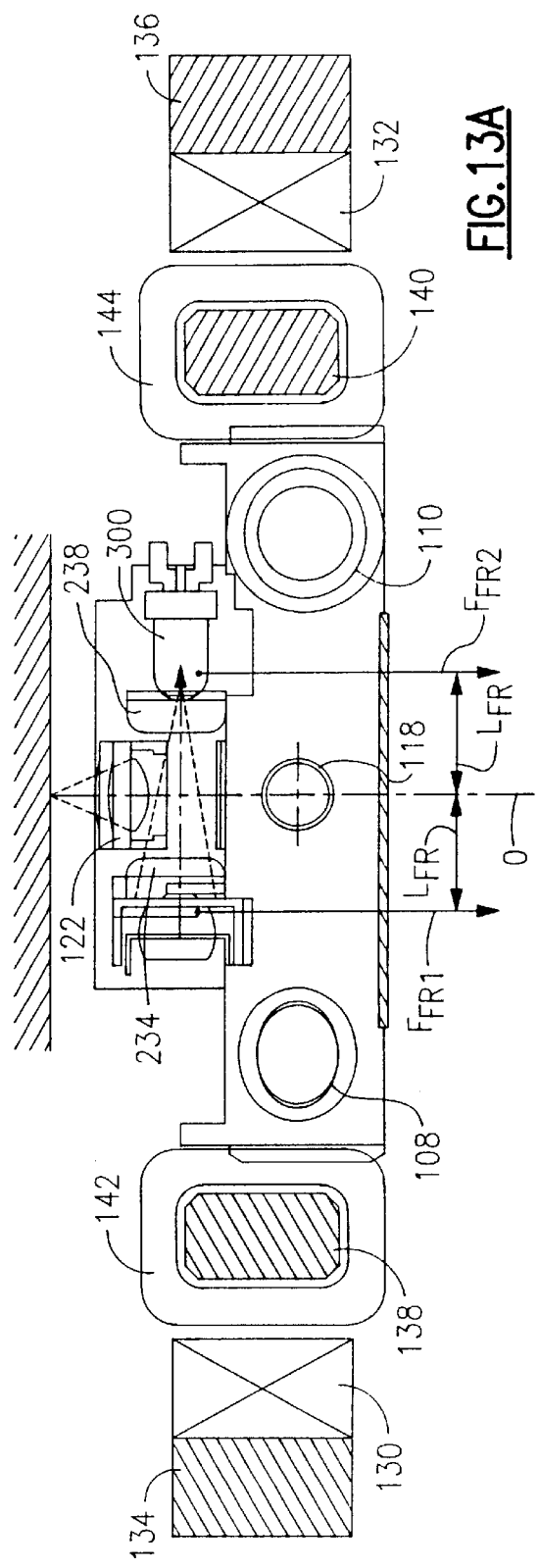

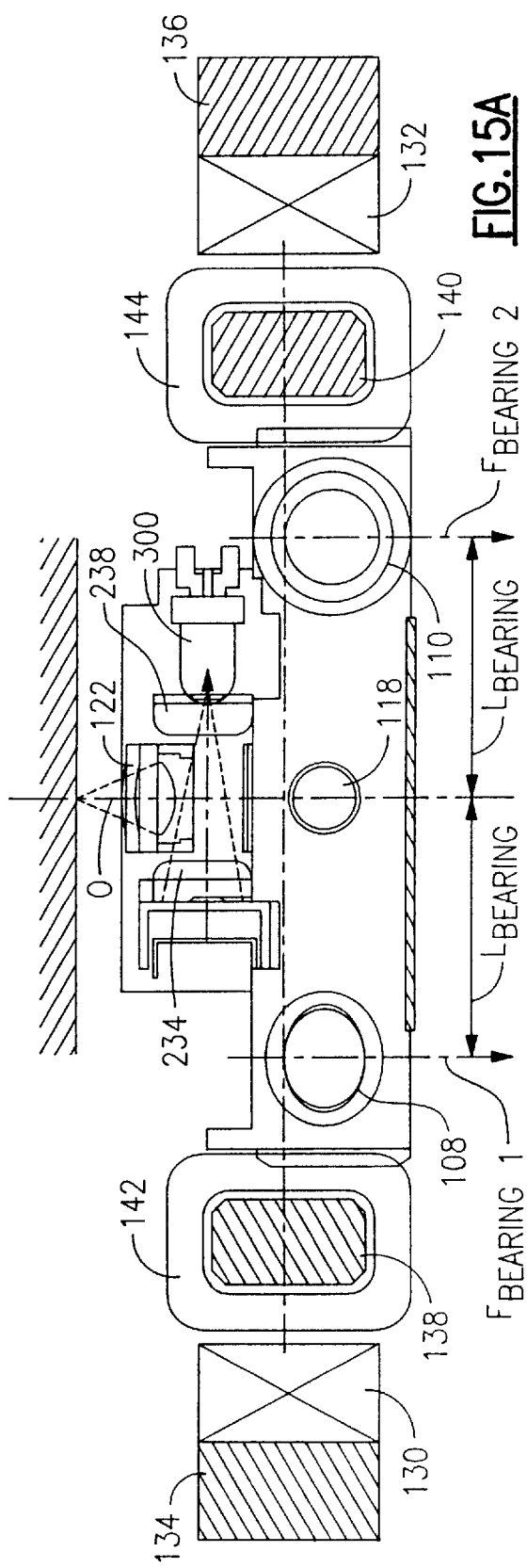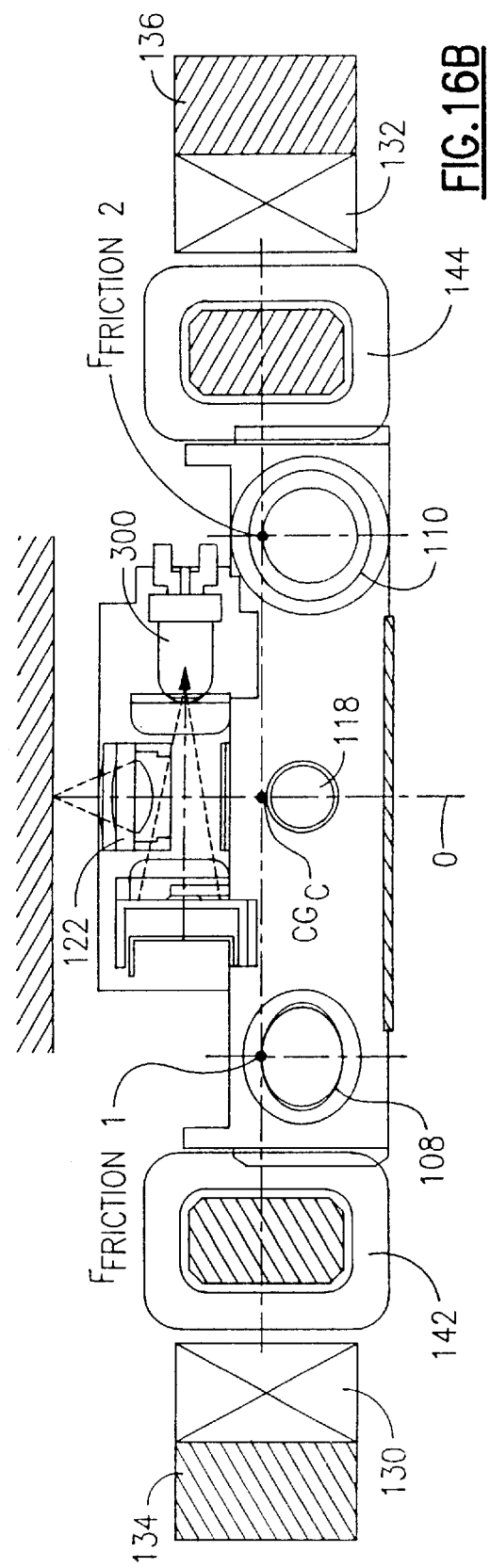

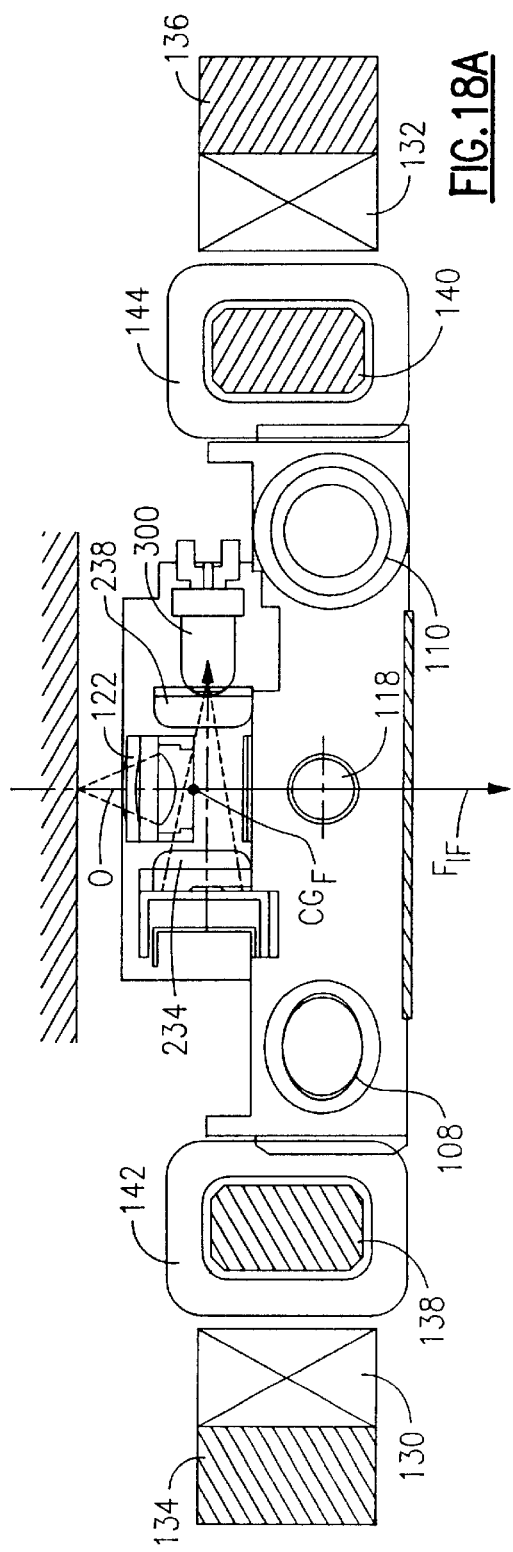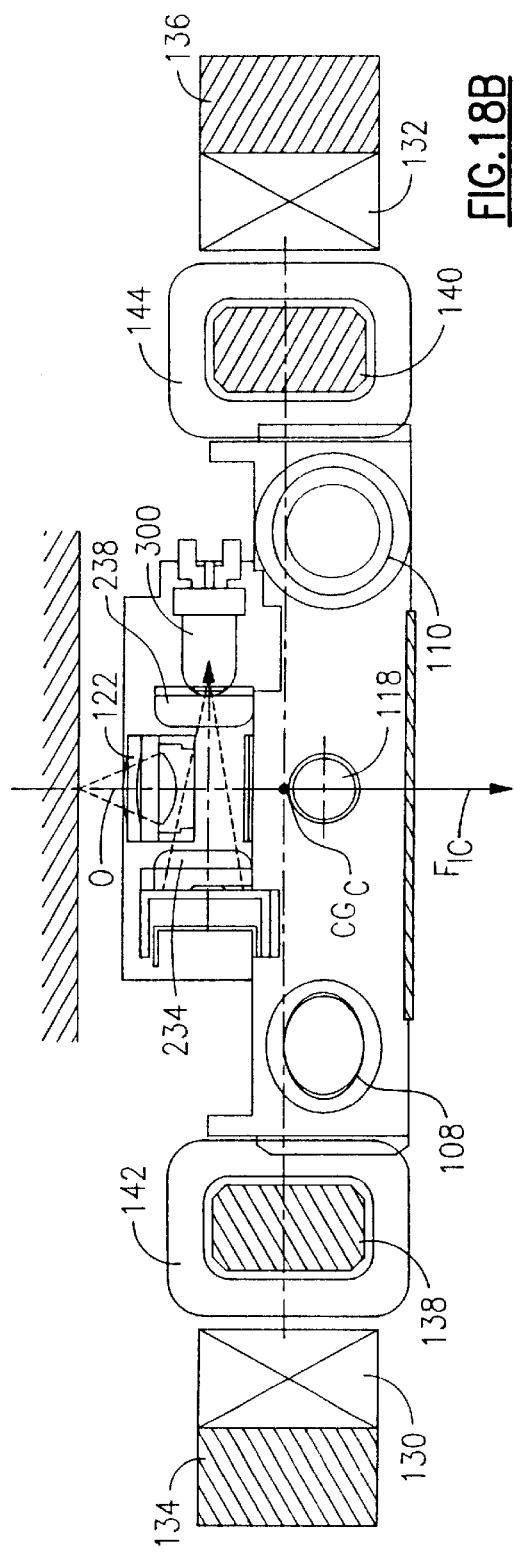

OPTICAL ACTUATOR ASSEMBLY WITH LENS POSITION SENSOR FOR RECORDING OR PLAYBACK

This application is a continuation of Ser. No. 08/907,267, filed Aug. 6, 1997, now U.S. Pat. No. 6,141,300, which is a continuation of Ser. No. 08/482,582, filed Jun. 7, 1995, now abandoned, which is a divisional of Ser. No. 08/399,268, filed Mar. 6, 1955, now U.S. Pat. No. 5,532,989, which is a continuation of Ser. No. 08/105,866, filed Aug. 11, 1993, now abandoned, which is a continuation of Ser. No. 07/657,155, filed Feb. 15, 1991, now U.S. Pat. No. 5,265,079.

FIELD OF THE INVENTION

The invention relates to optical disc recording systems and, in particular, to an electromagnetic carriage and actuator assembly for focussing, tracking, and random access in optical disc players and recorders.

BACKGROUND OF THE INVENTION

Optical data storage systems that utilize a focused laser beam to record and instantaneously playback information are very attractive in the computer mass storage industry. Such optical data storage systems offer very high data rates with very high storage density and rapid random access to the data stored on the information medium, most commonly an optical disc. In these types of optical disc memory systems, reading and writing data is often accomplished using a single laser source functioning at two respective intensities. During either operation, light from the laser source passes through an objective lens which converges the light beam to a specific focal point on the optical disc. During data retrieval, the laser light is focused on the recording medium and is altered by the information of the data storage medium. This light is then reflected off the disc, back through the objective lens, to a photodetector. It is this reflected signal that transmits the recorded information. It is thus especially important that, when information is being written to or read from the memory, the objective lens, and the exiting focused beam, be precisely focused at the center of the correct track so that the information may be accurately written and retrieved.

In order to attain a precise reading of the information stored on the disc, it is necessary to be able to move the objective lens in both a focussing (i.e., perpendicular to the plane of the disc) or Z direction in order to focus the laser beam to a small point of light on a precise location of the disc to write or retrieve information, and in a tracking (i.e., radial) or Y direction to position the beam over the exact center of the desired information track on the disc. Focus and tracking corrections may be effected by moving the objective lens in either the direction of the optical axis of the lens for focussing, or in a direction perpendicular to the optical axis for tracking.

In these systems, the position of the objective lens in the focus and tracking directions is commonly adjusted by control systems. Actuators support the objective lens and convert position correction signals from the feedback control systems into movement of the objective lens. As will be appreciated, failure to focus the light on a small enough area of the medium will result in too large a portion of the disc being used to store a given amount of information, or in too broad of an area of the disc being read. Likewise, the failure to precisely control the tracking of the laser light will result in the information being stored in the wrong location, or in information from the wrong location being read.

In addition to translation along the Z axis to effect focusing, and translation along the Y axis to effect tracking, there are at least four additional motion modes for the actuator, each of which reduces the accuracy of the reading and writing operations and is thus undesirable during normal operation of the system. These undesirable modes of motion are rotation about the X axis (an axis orthogonal to both the X direction and the Z direction), or pitch; rotation about the Z axis, referred to as yaw; rotation about the Y axis, called roll; and linear motion along the X axis, or tangential translation. Motion in these directions is often caused by motor and reaction forces acting on the carriage and/or actuator. These modes typically produce undesired movement during tracking or focussing operations which subsequently affects the alignment of the objective lens relative to the optical disc.

SUMMARY OF THE INVENTION

The present invention overcomes the drawbacks of the prior art devices by providing an apparatus for optical reading or recording information on an optical information medium, wherein as a result of the relative position of the components of the apparatus and the magnitude and application points of the forces exerted to track and focus, the objective lens through which information is read from the information medium, prevents the objective lens from being affected by most resonances, motor forces and reaction forces. This is critical in that in optical recording, displacements of 0.02 micrometers can easily be picked up.

Specifically, one aspect of the invention is an apparatus for optically reading or recording information on an optical disk which is rotatable about an axis of rotation, wherein the apparatus includes a frame, a carriage, a carriage drive, an objective lens, an objective lens holder and a focus drive. The carriage drive (i.e., those portions of the carriage motor which move relative to the frame) drives the carriage along a path radial to the axis of the rotation. The objective lens is mounted on the objective lens holder so that the optical axis of the objective lens is within 0.5 millimeters of intersecting the center of mass of the carriage mass. The holder is movable relative to the carriage so as to move the objective lens along its optical axis. This movement is controlled by a focus drive (i.e., those portions of the focus motor which move relative to the carriage) which drives the holder so as to move the objective lens along its optical axis. For purposes of this application including appended claims, the carriage and actuator assembly is considered to be broken down into two mass groupings. The first is the "fine motor mass" (i.e., the mass of all components suspended for freedom of movement from the carriage). The second is the "carriage mass" (i.e., the mass of all components which move with the carriage excluding the fine motor mass and any incidental connecting wiring not wholly supported by the carriage).

Another aspect of the invention is an apparatus for optically reading or recording information on an optical disk which is rotatable about an axis of rotation, wherein the apparatus includes a fine tracking drive (i.e., those portions of the fine tracking motor which move relative to the carriage) for driving the objective lens holder so as to make fine adjustments in the relative position of the objective lens along a path radial to the axis of rotation of the optical disk. The fine motor mass has a center of mass within 0.5 millimeters of a line parallel to the optical axis containing the center of mass of the carriage mass.

Another aspect of the invention is an apparatus for optically reading or recording information on an optical disk which is rotatable about an axis of rotation, wherein the apparatus includes a frame, a carriage, a carriage drive, an objective lens, an objective lens holder, a focus drive and a fine tracking drive, wherein the carriage mass and the fine motor mass each have a center of mass within 0.5 millimeters of the optical axis. Preferably, the carriage mass and the fine motor mass have respective centers of gravity within 0.5 mm of one another.

Another aspect of the present invention is an optical axis for optically reading or recording information on an optical disk which is rotatable about an axis of rotation having a frame, a carriage, a carriage drive, an objective lens, an objective lens holder, a focus drive and a fine tracking drive, wherein the net center of force exerted by the fine tracking drive is less than 0.2 mm from the optical axis. Another aspect of the invention is an apparatus for optically reading or recording information on an optical disk having a frame, a carriage, a carriage drive, an objective lens, an objective lens holder, a focus drive and a fine tracking drive, wherein the center of force exerted by the coarse tracking drive is less than 0.2 mm from said optical axis.

Yet another aspect of the invention is an apparatus for optically reading or recording information on an optical disk having a frame, a carriage, a carriage drive, an objective lens, an objective lens holder, a focus drive and a fine tracking drive, wherein the carriage drive exerts a pair of forces on the carriage to drive the carriage along a radial path and the distance between the center of mass of the carriage and the point upon which one of the forces acts is within 0.2 millimeters of the distance between the center of mass of the carriage and the point upon which the other carriage drive force acts.

BRIEF DESCRIPTION OF THE DRAWINGS

FIG. 6 is a side schematic view further illustrating the coarse tracking forces;

FIG. 9b is a schematic side view illustrating the symmetry of coarse tracking forces in the vertical plane;

FIG. 12a is a schematic side view illustrating the symmetry of focus forces in the horizontal plane;

FIG. 13a ia a schematic side view which illustrates the symmetry of focus reaction forces in the horizontal plane;

FIG. 15a is a schematic side view which illustrates the symmetry of carriage suspension forces in the horizontal plane;

FIG. 16b is a schematic side view illustrating the alignment of the friction forces with the center of mass of the carriage;

FIG. 18a is a schematic side view illustrating the alignment of the net inertial force of the fine motor with the optical axis of the objective lens;

FIG. 18b is a schematic side view illustrating the alignment of the net inertial force of the carriage with the optical axis of the objective lens;

DETAILED DESCRIPTION OF THE PREFERRED EMBODIMENT

Figure 1:
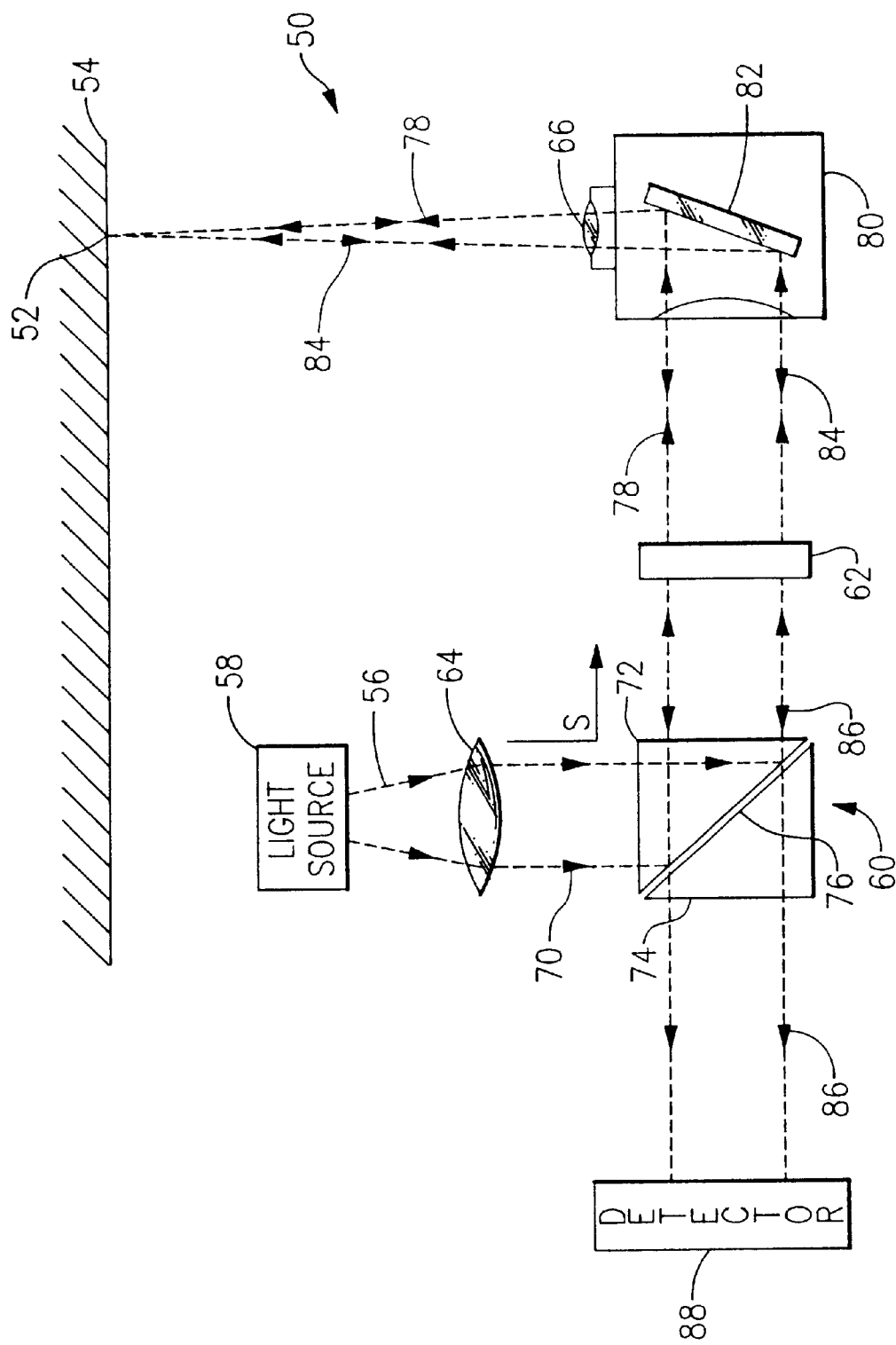
FIG. 1 schematically illustrates an exemplary optical read/write system in which the carriage and actuator assembly of the present invention may be used.

FIG. 1 schematically illustrates the operation of an exemplary optical read/write system 50 in reading data from a precise location 52 on an information storage medium, such as an optical disc 54. While the system 50 illustrated is a write-once or WORM system, those skilled in the art will recognize that the carriage and actuator assembly of the present invention could also be used in magneto-optical erasable systems. Information is transmitted to and read from the disc 54 utilizing a light beam 56 produced by a light source 58 which passes through a plurality of components including a cube-shaped beamsplitter 60 which separates the light beam 56 according to its polarization, a quarter wave plate 62 which changes the polarization of the light beam 58, a collimator lens 64, and an objective lens 66, which, in combination, direct the light beam 56 toward the desired location 52 on the disc 54.

In operation, the light source element 58, typically a laser diode, emits the light beam 56 toward the convex collimator lens 64. The collimator lens 64 converts this source beam 56 into a parallel, linearly S polarized light beam 70 and conducts the beam 70 toward the beamsplitter 60. This cube-shaped beamsplitter 60 is formed by attaching two right angle prisms 72, 74 along their respective hypotenuses and includes a polarization sensitive coating forming a beamsplitting interface 76 between the two hypotenuses. The beamsplitter 60 separates and/or combines light beams of differing polarization states, namely linear S polarization and linear P polarization. Separation is accomplished in conjunction with the polarization sensitive coating which transmits linearly P polarized light beams and reflects linearly polarized S light beams. Light exiting the beamsplitter 60 passes through the quarter wave plate 62 which converts the linearly polarized light beam 70 to a circularly polarized light beam 78. Upon exiting the quarter wave plate 62, the circularly polarized beam 78 enters an actuator 80.

The actuator 80 includes a mirror 82 which orthogonally reflects the light beam 78 upward toward the objective lens 66. This objective lens 66 converges the circularly polarized beam 78 to the precise focal point 52 on surface of the optical disc 54. Upon striking the disc 54, the circularly polarized light beam 78 is altered by the information stored on the disc 54 and is reflected as a divergent circularly polarized light beam 84 carrying information identical to that encoded on the disc 54. This reflected circularly polarized light beam 84 re-enters the objective lens 66 where it is collimated. The light beam 84 is again reflected from the mirror 82 and re-enters the quarter wave plate 62. Upon exiting the quarter wave plate 62, the circularly polarized beam 84 is converted to a linearly P polarized light beam 86. As linearly P polarized light beams are transmitted through the beamsplitter 60 without reflection at the splitting interface, this light beam 86 continues to a photodetector 88, which detects the data stored on the disc 54. In addition, if the light beam 86 falling on the photodetector 88 is out of focus or misaligned, the amount of misalignment or defocusing is measured electronically and used as feedback for a servo system (not shown) which properly realigns the objective lens 66.

Figure 2:
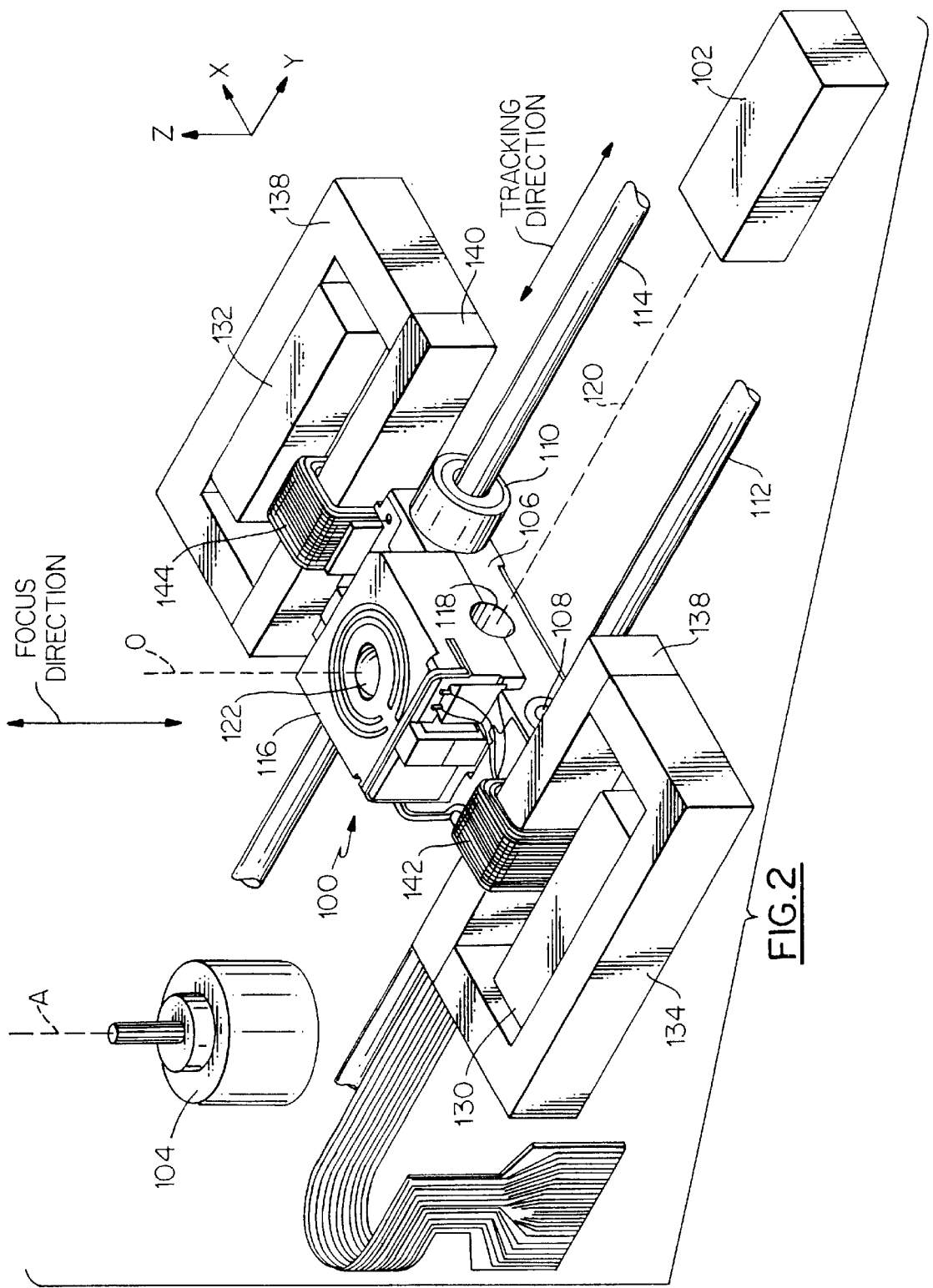
FIG. 2 is a perspective view of the carriage and actuator assembly.

FIG. 2 illustrates an electromagnetic carriage and actuator assembly 100 constructed in accordance with the present invention. The assembly can be used with an optics module 102 to read and write data onto the surface of an optical disc as described above in connection with FIG. 1, wherein the light source 58, detector 88, collimating lens 64, quarter wave plate 62, and beamsplitter 60 are all incorporated within the module 102. A spindle motor 104 is located adjacent the assembly 100 and rotates an optical disc (not shown) about an axis of rotation A above the assembly 100. The assembly 100 includes a carriage 106 having first and second bearing surfaces 108, 110 slidably mounted on first and second guide rails 112, 114, respectively, and an actuator 116 which is mounted on the carriage 106. As will be appreciated, these rails 112, 114 provide a frame along which the carriage moves. A beam of light 120 emitted from the light source 58 in the optics module 102 enters the actuator 116 through a circular aperture 118 and is reflected by a mirror contained inside the actuator through an objective lens 122 defining an optical axis O to the surface of the disc. As will be appreciated, the axis of rotation A of the disc is parallel to the optical axis O of the objective lens 122.

The carriage 106 and actuator 116 carried thereon are moved horizontally along the rails 112, 114 in a tracking direction by a coarse tracking motor to access various information tracks on the surface of the disc. The tracking motor includes two permanent magnets 130, 132 wherein each magnet is attached to a C-shaped outer pole piece 134, 136, respectively. Two inner pole pieces 138, 140 are positioned across the ends of the outer pole pieces 134, 136 so as to form a rectangular box around the permanent magnets 130, 132. Two coarse coils 142, 144 of equal length are affixed to the bearing surfaces 108, 110 and surround the inner pole pieces 138, 140 with sufficient clearance to move over the pole pieces 138, 140 when the carriage 106 is moved in the tracking direction. In this embodiment, these coarse coils 142, 144 are the only portion of the course tracking motor that are movable. As will be described in more detail below, the actuator 116 can also move the objective lens 122 closer to or farther away from the disc, thereby focussing the exiting light beam 120 upon the desired location on the surface of the disc.

Figure 3:
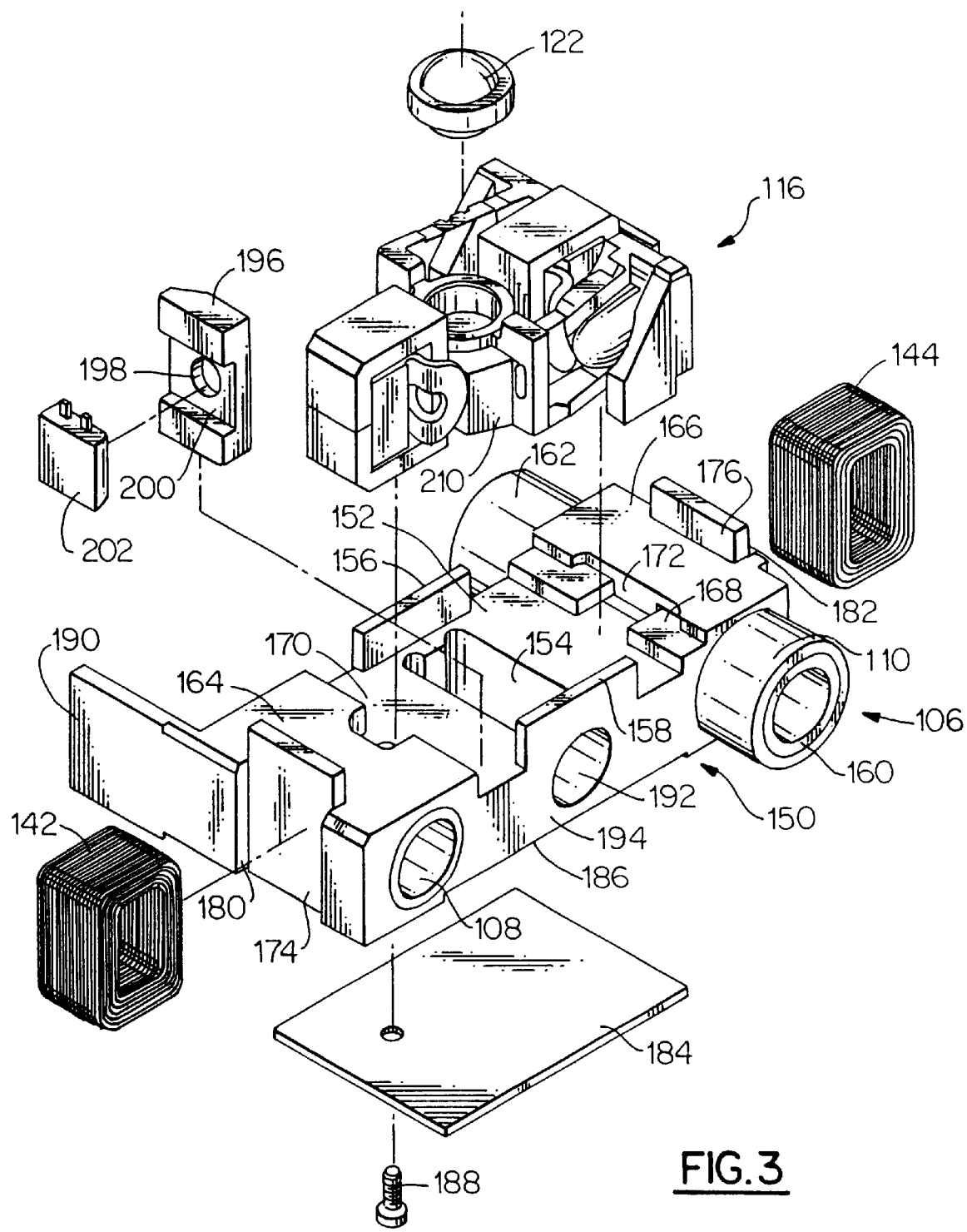
FIG. 3 is an exploded view of the carriage and actuator assembly.

FIG. 3 is an exploded view illustrating the carriage 106 and actuator 116 in greater detail. The carriage 106 includes a generally rectangular base 150 to which the actuator 116 is attached. The base 150 has a substantially flat top surface 152 having a generally rectangular chamber 154 formed therein. The first bearing surface is cylindrical in shape, while the second bearing surface 110 consists of two elliptical bearing sections 160, 162 of approximately equal length which meet inside the base 150. The spacing of the rails 112, 114 relative to the optical axis O is selected such that each bearing surface 108, 110 is subjected to the same amount of preload. The bearing surfaces 108, 110 are further designed such that both surfaces have substantially the same amount of surface area contacting the rails 112, 114. The length of the bearing sections comprising the second bearing surface is approximately equal to the length of the first bearing surface, although minor variations in length may be necessary to account for wear.

Two vertical walls 156, 158 extend upwardly from the top surface 152 of the base 150 adjacent the ends of the chamber 154. The base 150 further includes two platform regions 164, 166 formed at the ends of the base 150 above the bearing surfaces 108, 110. A step 168 joins the top surface 152 of the base 150 with the second platform region 166. A first U-shaped notch 170 is formed in the first platform region 164, and a second U-shaped notch 172 is formed in the second platform region 166 and step 168.

The coarse coils 142, 144 are attached to two vertical plates 174, 176 respectively. The plates 174, 176 are positioned in notches 180, 182 formed in the ends of the base 150. The base 150 further includes a mass balancing plate 184 which is attached to a bottom surface 186 of the base 150 via a screw 188, and a mass balancing projection 190 which extends outwardly from the base 150 adjacent the first coarse coil 142. A circular aperture 192 is formed in a front side 194 of the base 150 and receives the light beam 120 emitted from the optics module 102 (FIG. 2). A bracket 196 having a circular aperture 198 therein is positioned between the second vertical wall 158 and the first platform region 164 along the front side 194 of the base 150. The bracket 196 additionally includes a notch 200 which receives a photodetector 202 such that the photodetector 202 is positioned between the bracket 196 and the first platform region 164.

The actuator 116, often referred to as a "2-D" actuator for 2 degrees of motion, i.e. focussing and tracking, is mounted on the base 150 between the vertical walls 156, 158 and the platform regions 164, 166. A prism (not shown) is positioned within the chamber 154 in the base 150 to deflect the light beam 120 emitted from the optics module 102 such that the beam 120 exits the actuator 116 through the objective lens 122. The objective lens 122 is positioned within a lens holder 210 attached to a focus and fine tracking motor which moves the lens 122 so as to precisely align and focus the exiting beam 120 upon a desired location on the surface of the optical disc. The objective lens 122 defines an optical axis O which extends vertically through the center of the lens.

Figure 4:
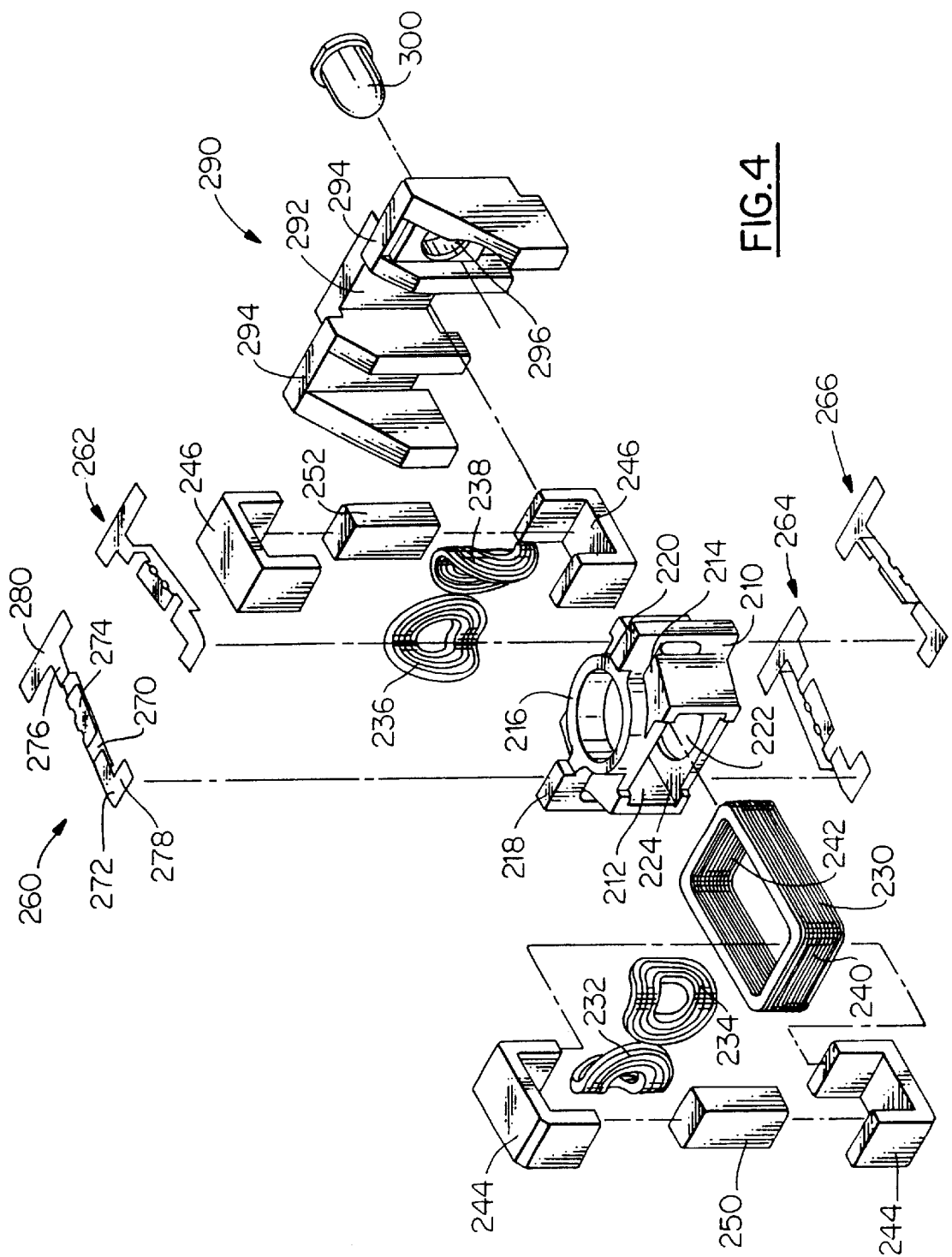
FIG. 4 is an exploded view of the actuator.

The components of the actuator 116 are best seen in FIG. 4. The lens holder 210 is generally rectangular in shape and includes a generally rectangular opening 212 formed therethrough. A top surface 214 of the lens holder 210 includes a circular collar 216 positioned between two shoulders 218, 220. A circular aperture 222 having a diameter substantially equal to that of the collar 216 is formed in a bottom surface 224 of the lens holder. A rectangular focus coil 230 is positioned within the rectangular opening 212 in the lens holder 210. Two oval-shaped, fine tracking coils 232, 234, are positioned at the corners of a first end 240 of the focus coil 230, and two more identical tracking coils 236, 238 are positioned at the corners of a second end 242 of the focus coil 230. A first pair of U-shaped pole pieces 244 is positioned to surround the first end 240 of the focus coil 230 and tracking coils 232, 234 attached thereto, while a second pair of U-shaped pole pieces 246 surrounds the second end 242 of the focus coil 230 and tracking coils 236, 238 attached thereto. In addition, two permanent magnets 250, 252 are positioned between the pole piece pairs 244, 246, adjacent the tracking coils 232, 234; 236, 238 respectively.

Two top flexure arms 260, 262 are attached to the top surface 214 of the lens holder 210 while two additional bottom flexure arms 264, 266 are attached to a bottom surface of the lens holder 210. Each flexure arm preferably consists of a thin sheet of etched or stamped metal (typically steel or beryllium copper) with a thickness in the order of 25 micrometers to 75 micrometers. For simplicity, only the flexure arm 260 will be described, however, it should be noted that the remaining flexure arms 262, 264, 266 are of identical structure. The flexure arm 260 includes a first vertical section 270 attached to first, second and third horizontal sections 272, 274, 276. The third horizontal section 276 is further attached to a perpendicular crossbar 280. The first horizontal section includes a shoulder 272 which attaches to the corresponding shoulder 218 on the lens holder 210. Further, the shoulder of the second top flexure arm 262 attaches to the corresponding shoulder 220, while the shoulders of the bottom flexure arms 264, 266 attach to similar structures on the bottom surface of the lens holder 210.

The flexures 260, 262, 264, 266 are further attached to a support member 290. The support member 290 includes a central notch 292 which receives the second pair of pole pieces 246. A ledge 294 is formed on each side of the notch 292 on the top and bottom surfaces of the support member 290. The crossbar sections 280 of the flexure arms 260, 262 are attached to these ledges 294, while flexure arms 264, 266 are connected to corresponding ledges on the bottom of the support member 290 so as to cooperatively suspend the lens holder 210 from the support member 290. The support member 290 further includes an aperture 296 for receiving a light emitting diode 300. The diode 300 is in alignment with the aperture 198 in the bracket 196 (FIG. 3) and photodetector 202 positioned within the notch 200 in the bracket, such that when the light emitting diode 300 is energized, substantially collimated light is emitted through the aperture 198 in the bracket 196 and is incident upon the photodetector 202. Depending on the position of the lens holder 210 with respect to the support member 290, light emitted by the diode 300 will fall onto various portions of the detector 202. By analyzing the amount of light incident upon the detector 202, a position correction signal can be generated to determine the amount of displacement required for precise focusing and tracking at the desired location on the surface of the disc.

In the illustrated embodiment, the fine motor mass consists of the lens holder 210, the objective lens 122, the focus coil 230, and the fine tracking coils 232, 234, 236 and 238. The carriage mass consists of the base 150, coarse tracking coils 142 and 144, the bracket 196, and photodetector 202, the support member 290, the vertical plates 174 and 176, the mass balancing plate 184 and screw 188, the permanent magnets 250 and 252, the pole pieces 244 and 246, and the bearing surfaces 108 and 110.

With reference to the above description in connection with FIGS. 3 and 4, the coarse tracking coils 142, 144 have equal dimensions and are symmetric about optical axis O of the objective lens. Further, the tracking coil pairs 232, 234 and 236, 238 have equal dimensions and are symmetric about optical axis O of the lens 122. The dimensions of the mass balance plate 184 and mass balance projection 184 are advantageously selected to compensate for the mass of the support member 290, flexures 260, 262, 264, 266, bearing surfaces 108, 110, bracket 196 and photodetector 202, such that the center of mass of the carriage and the center of mass of the fine and focus drives (consisting of the pole pieces 244, 246, the permanent magnets 250, 252, the focus coil 230, and tracking coils 232, 234, 236, 238) are generally intersected by the optical axis O of the lens 122. As will be described in more detail below, alignment of these centers of gravity with the optical axis O of the lens 122, and the symmetry of the motor forces and reaction forces acting on the carriage 106 and actuator 116 ensure that undesirable modes of motion which adversely affect position of the objective lens 122 are minimized.

Figure 5:
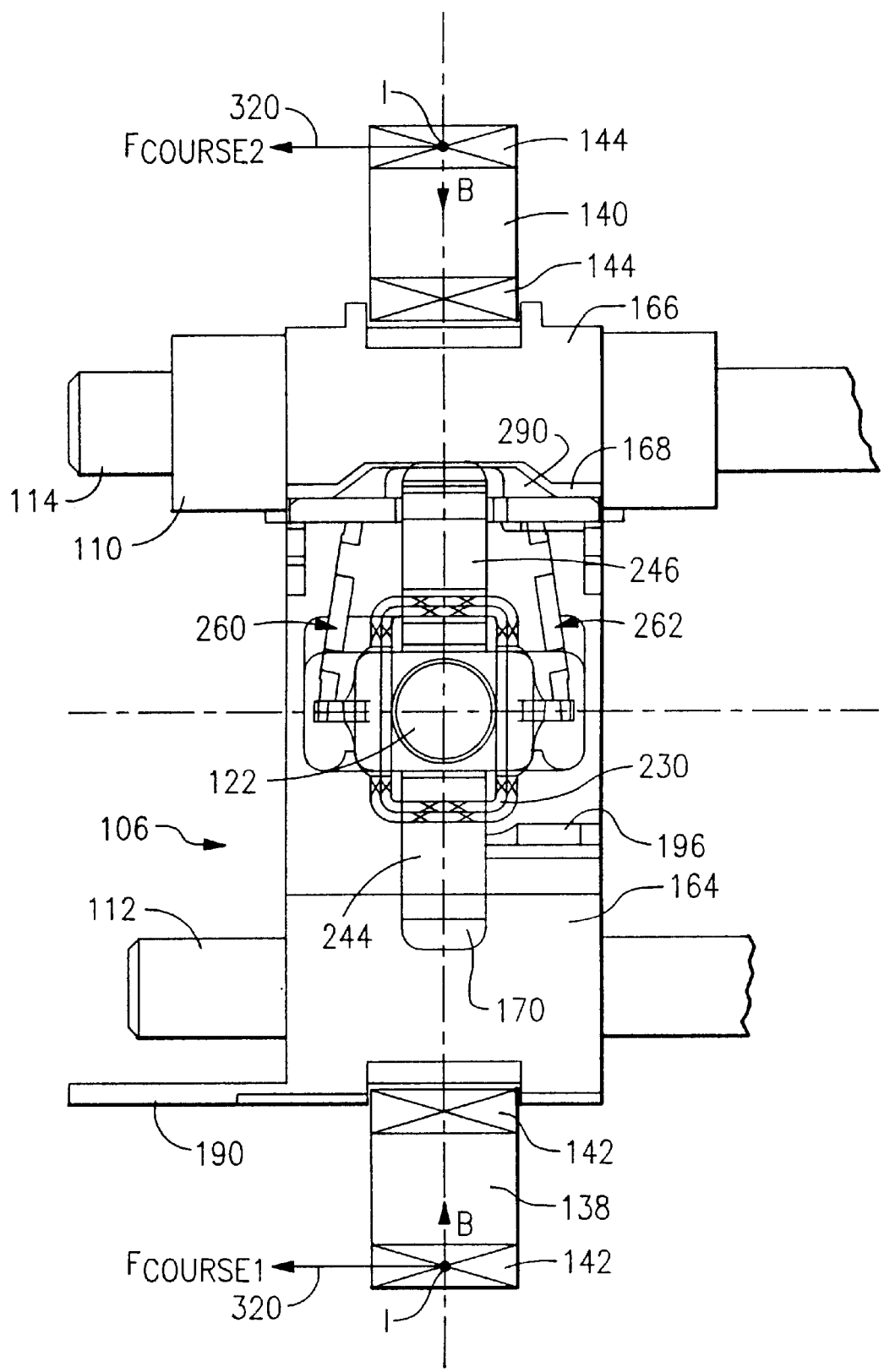
FIG. 5 is a schematic top view illustrating the coarse tracking forces acting on the assembly.

Referring to FIG. 5, the permanent magnets 130, 132 adjacent the coarse tracking coils 142, 144 generate a magnetic field B whose lines of flux extend inwardly toward the coarse coils 142, 144. When coarse tracking movement is required to position the objective lens 122 beneath a selected track on the optical disc, current is applied to the coarse tracking coils 142, 144. The current interacts with the magnetic field B to produce forces which move the carriage 106 in the tracking direction. The forces are generated according to the Lorentz law $F=B \times Il$, wherein F represents the force acting on the focus coil, B represents the magnetic flux density of the magnetic field between the two permanent magnets, I represents the current through the focus coil, and l represents the length of the coil. For example, when the current I applied to the first coarse tracking coil 142 travels through the portion of the coil positioned within the magnetic field B in the direction into the plane of the figure, a force $F_{Coarse1}$ in the direction of the arrow 320 is produced. Similarly, when current I travels through the portions of the second tracking coil 144 positioned within the magnetic field B in the direction out of the plane of the figure, a force $F_{Coarse2}$ in the direction of the arrow 322 is produced. The forces $F_{Coarse1}$ and $F_{Coarse2}$ act to move the carriage 106 horizontally to the left.

Conversely, FIG. 6 shows that if the direction of the current I within the portions of the tracking coils 142, 144 within the magnetic field B is reversed, forces $F_{Coarse1}$, and $F_{Coarse2}$, are produced which act to move the carriage into the plane of the figure (to the right in FIG. 5). The amount of movement in the tracking direction depends on the amount of current applied to the coarse coils 142, 144. In this manner, the carriage 106 is moved to position the objective lens 122 such that the laser beam 120 exiting the lens 122 is focused within a desired information track on the surface of the optical disc.

When a control signal is generated by the optics module 102, a given current is applied to either the fine tracking coils 232, 234, 236, 238, or the focus coil 230 depending on the direction in which the displacement of the lens holder 210 and objective lens 122 attached thereto is required. Such servo system and feedback circuits which control the amount of current are well known in the art. This current interacts with the electromagnetic field produced by the permanent magnets 250, 252 to create a force which displaces the lens holder 210 and the objective lens 122 attached thereto in the appropriate tracking or focussing direction. For example, if re-positioning is desired in the focus direction, according to a focus error signal, this signal is transmitted to a servo amplifier (not shown), which generates a current through the focus coil 230. As described above, a force is generated according to the Lorentz law $F=B\times I$.

Figure 7:
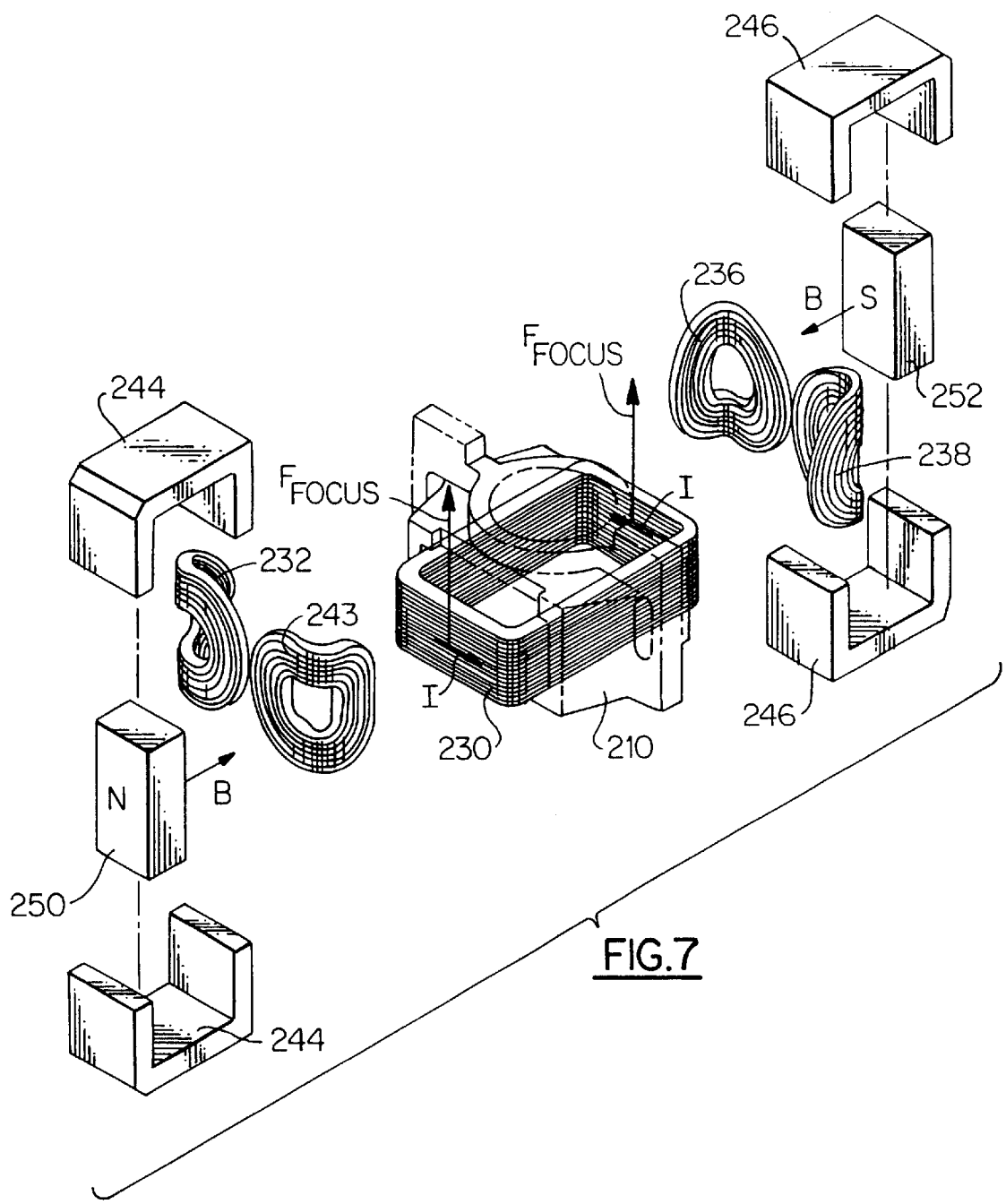
FIG. 7 is an exploded view which illustrates the focus forces acting on the actuator.

Referring to FIG. 7, the permanent magnets 250, 252 of the 2-D actuator 116 are oriented such that the south poles of each magnet 250, 252 face the lens holder 210. In this configuration, a magnetic field B is formed whose lines of flux originate at the magnets 250, 252 and are directed inwardly toward the lens holder 210 as shown. When a current I is applied to the focus coil 230 and travels through the portions of the coil 230 positioned within the magnetic field B in the direction shown, an upward force $F_{Focus}$ is generated at each section of the focus coil 230 which is translated to the flexure arms 260, 262, 264, 266, bending the flexure arms to move the lens holder 210 and associated objective lens 122 closer to the optical disc. Conversely, when the current I is run through the coil sections in the opposite directions as those illustrated, a downward force is generated which acts on the flexures to move the lens holder 210 and objective lens 122 farther away from the surface of the optical disc. The magnitude of the displacement is dependent upon the amount of current applied to the focus coil 230. By moving the objective lens 122 closer to or farther away from the surface of the optical disc, the focus coil 230 acts to precisely focus the laser beam 120 exiting the objective lens 122 within the desired information track on the disc.

Figure 8:
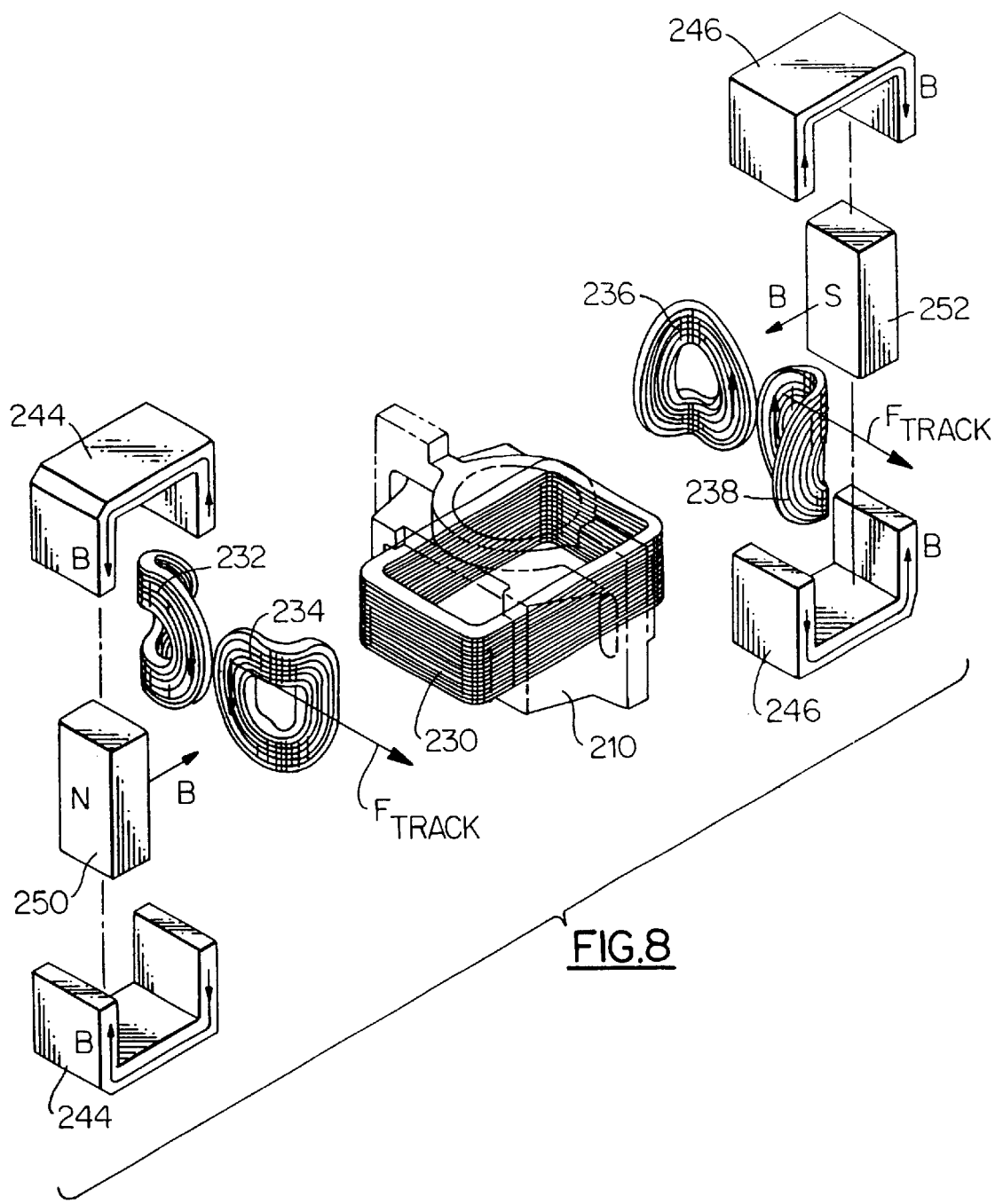
FIG. 8 is an exploded view which illustrates the fine tracking forces acting on the actuator.

As shown in FIG. 8, movement of the actuator 116 to effect fine tracking is produced when current is generated in the four fine tracking coils 232, 234, 236. 238 affixed to the focus coil 230. When current is applied to the tracking coils in the directions shown through the portions of the tracking coils positioned within the magnetic field B, forces $F_{Track}$ are produced with move the lens holder 210 to the right. When the forces $F_{Track}$ act on the tracking coils 232, 234, 236, 238, they are translated through the focus coil 230 and lens holder 210 to the flexures 260, 262, 264, 268 which bend in the corresponding direction and the objective lens 122 is moved in the direction of the forces, to the right in FIG. 8. When current travels through the tracking coils 232, 234, 236, 238 in the opposite direction, a force is generated which acts to move the lens holder 210 to the left. The amount of current applied to the fine tracking coils 232, 234, 236, 238 is relatively small in comparison with the amount applied to the coarse tracking coils 242, 244, and the dimensions of the fine tracking coils much smaller than the coarse coils to increase resonance frequencies and thus enable higher servo bandwidths which can then control to tighter track errors.

FIGS. 9–16 are schematic diagrams of the actuator and carriage assembly 100 which illustrate the symmetry and balancing of forces achieved with the design of the present invention.

Figure 9A:
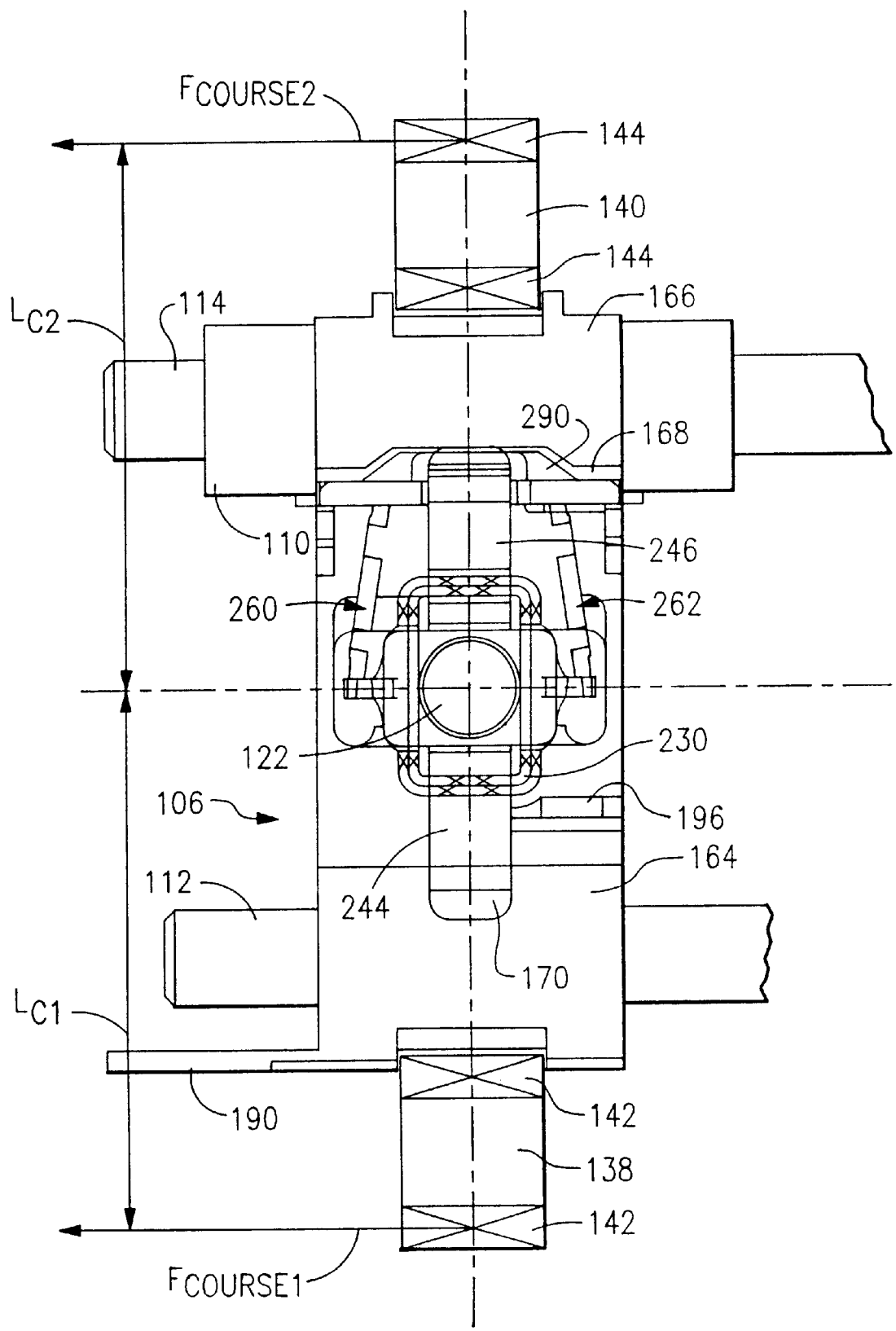
FIG. 9a is a schematic top view illustrating the symmetry of coarse tracking forces in the horizontal plane.

FIG. 9a is a schematic diagram illustrating the symmetry of coarse or carriage motor forces acting on the actuator 116 in the horizonal plane. When current is applied to the coarse tracking coils 142, 144 as described above, forces $F_{Coarse1}$ and $F_{Coarse2}$ are produced which are centered within the portion of the coarse coils 142, 144 located adjacent the permanent magnets 130, 132, respectively. The dimensions of the first coarse coil 142 are selected to equal the dimensions of the second coarse coil 144, and the current applied to each coil is the same, such that the forces $F_{Coarse1}$ and $F_{Coarse2}$ acting on the coils are equal. Further, the coarse coils 142, 144 are positioned at equal distances $L_{C1}$ and $L_{C2}$ from the objective lens 122 such that the resulting moments about the optical axis O of the objective lens 122 are equal, and the carriage yaw is minimized. In FIG. 9b, the centers of the coarse motor forces $F_{Coarse1}$ and $F_{Coarse2}$ are illustrated in the vertical plane. Because the forces $F_{Coarse1}$ and $F_{Coarse2}$ are vertically aligned with the center of mass of the carriage $CM_C$ (i.e., are generally intersected by a line orthogonal to the radial direction and the optical axis O containing the center of gravity of the carriage $CR_C$), the moments about the horizontal axis are equal, and carriage pitch which can cause the prism to deflect the beam angle, thereby introducing track offset, is reduced.

Figure 10A:
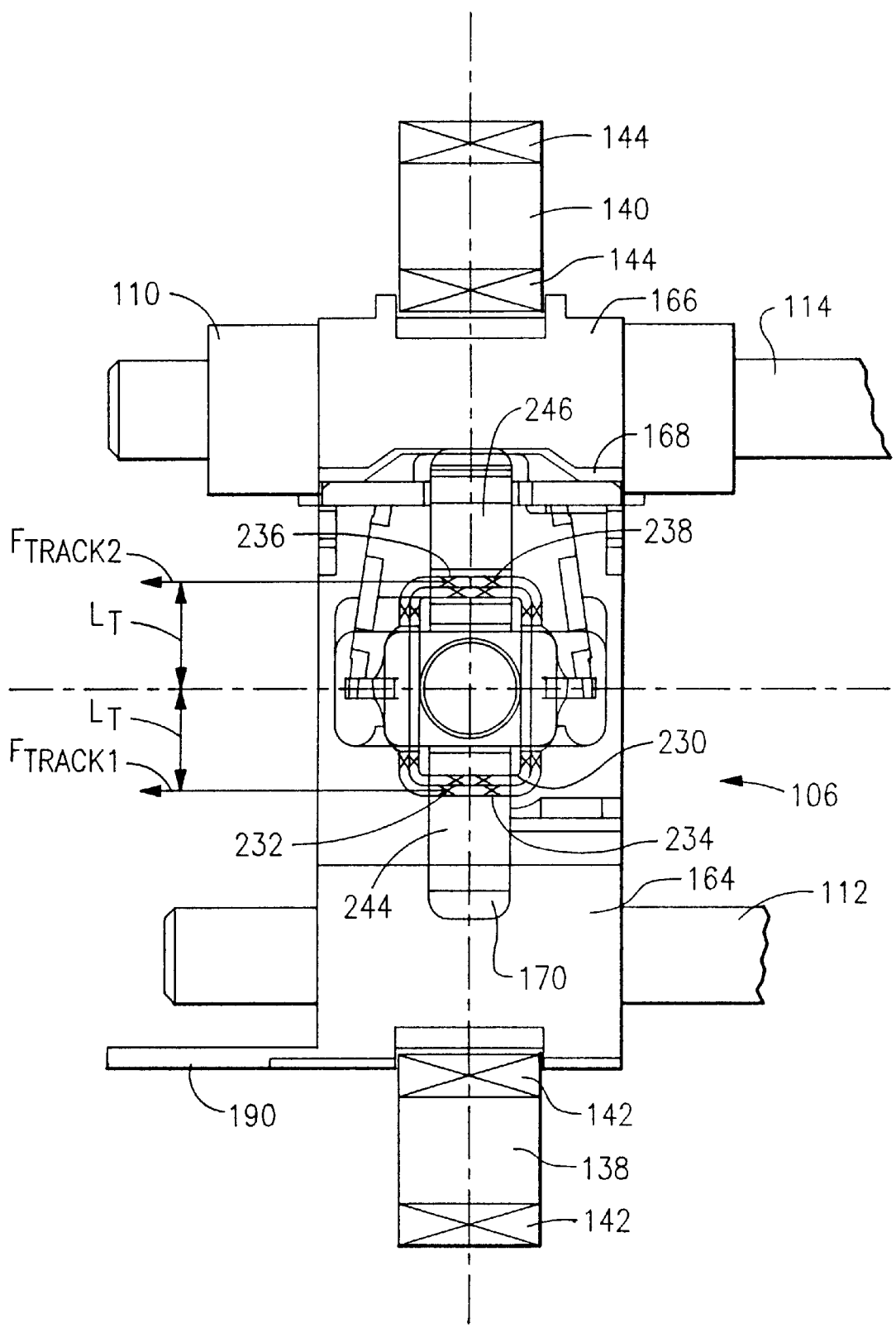
FIG. 10a is a schematic top view illustrating the symmetry of fine tracking forces in the horizontal plane.
Figure 10B:
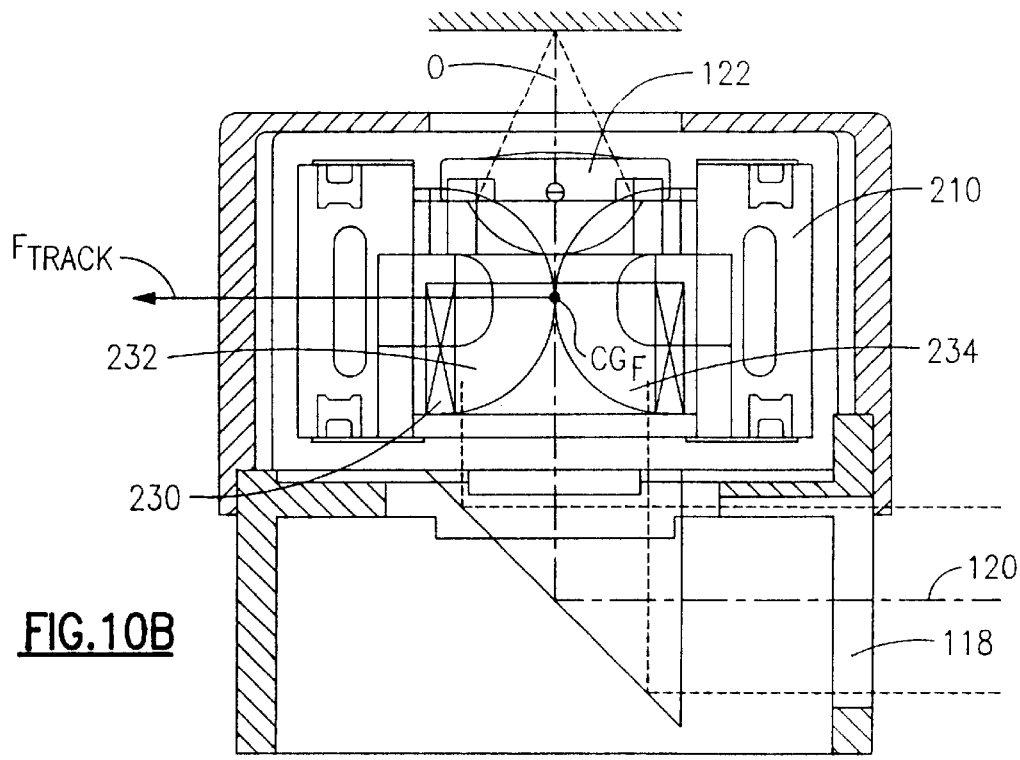
FIG. 10b ia a schematic end view illustrating the alignment of the net fine tracking force with the center of mass of the fine tracking motor.

The fine tracking motor forces in the horizontal and vertical planes are illustrated in FIGS. 10a and 10b. The forces $F_{Track1}$ and $F_{Track2}$ produced by the energization of the fine tracking coils 232, 234, 236, 238 within the magnetic field induced by the permanent magnets 250, 252 are centered between the pairs of fine tracking coils 232, 234 and 236, 238, and extend horizontally in the tracking direction. The dimensions of the coils are equal and the amount of current applied to the coils is equal as well, such that the magnitude of the resulting forces $F_{Track1}$ and $F_{Track2}$ is equal. Additionally, the fine tracking coils 232, 234, 236, 238 are positioned at equal distances $L_T$ from the optical axis O of the focus lens 122, and thus, the moments produced about the optical axis O are equal, such that yaw of the lens holder 210 and lens 122 carried thereon about the vertical axis is decreased. As illustrated in FIG. 10b, the resultant fine tracking force $F_{Track}$ acts on the center of mass of the fine motor mass $CM_F$, such that lens holder pitch is minimized.

Figure 11B:
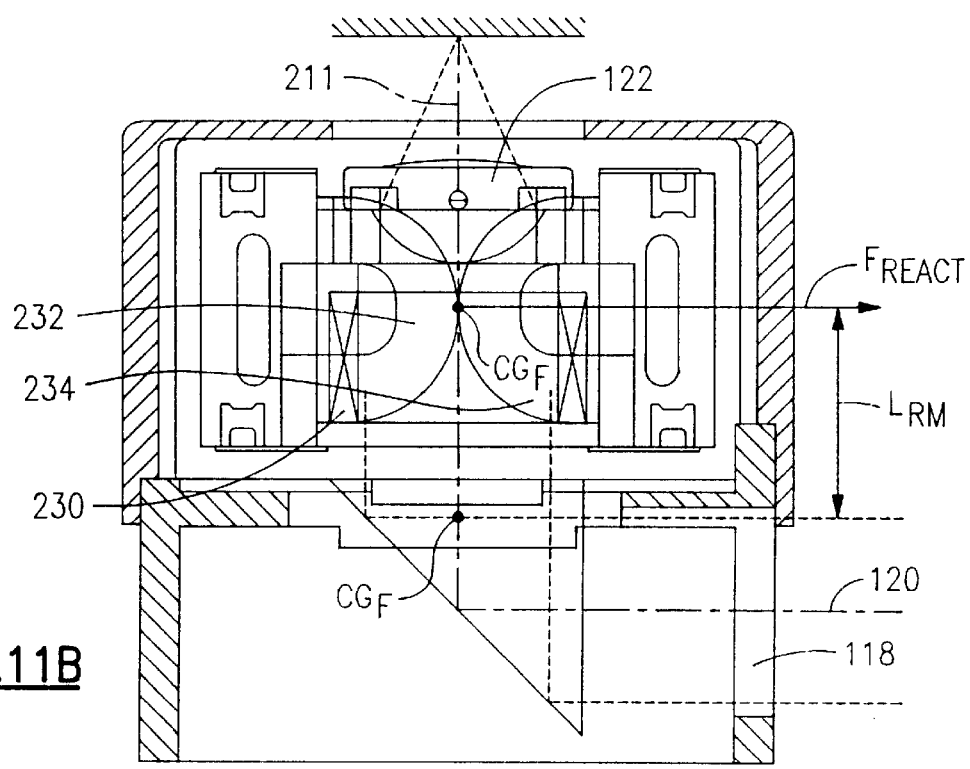
FIG. 11b is a schematic end view illustrating the alignment of the net fine tracking reaction force with the center of mass of the fine tracking motor.
Figure 11A:
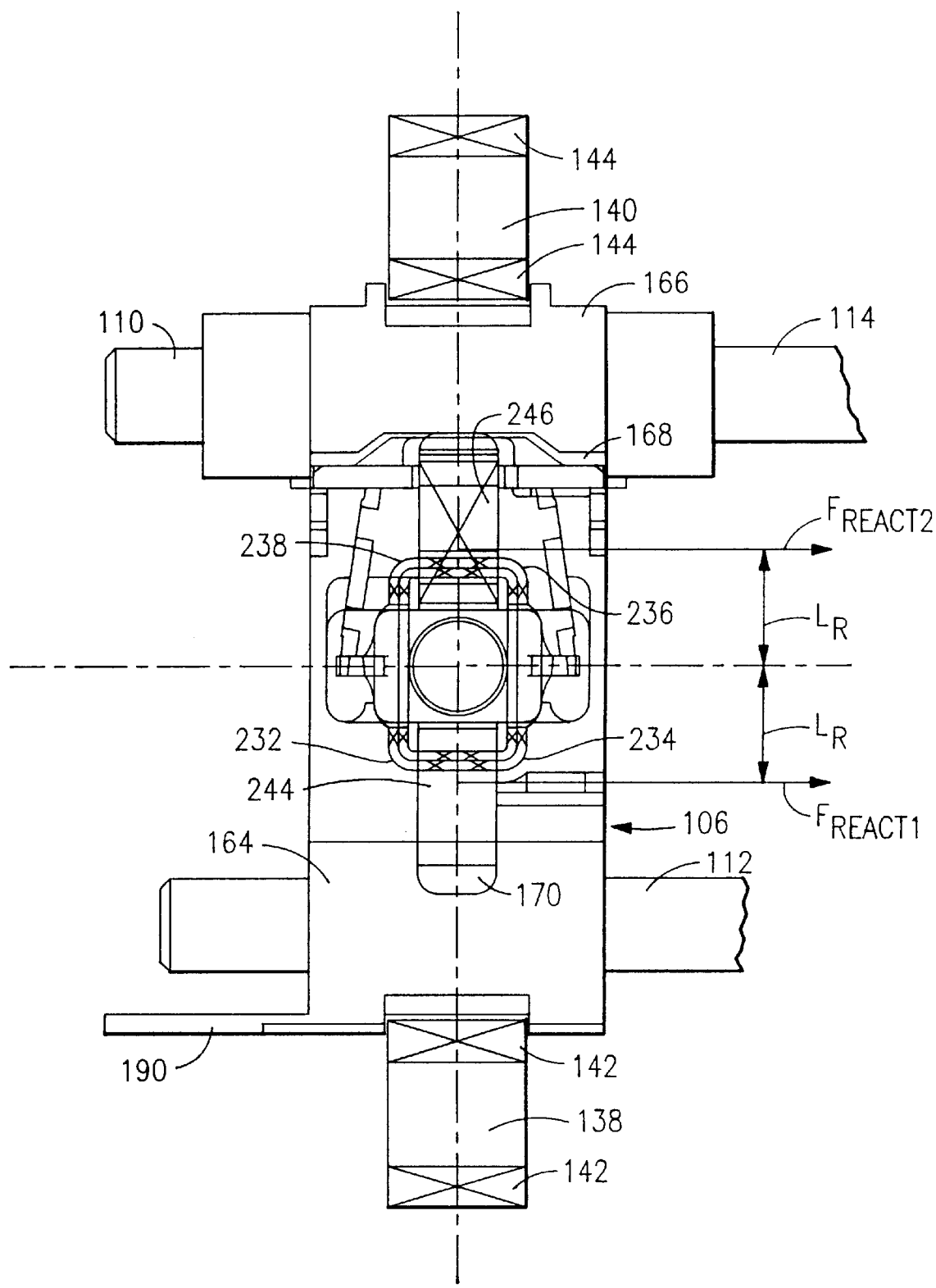
FIG. 11a is a schematic top view illustrating the symmetry of fine tracking reaction forces in the horizontal plane.

FIG. 11a illustrates the reaction forces $F_{React1}$ and $F_{React2}$ resulting from the fine tracking motor which act upon the carriage 106 in opposition to the fine tracking motor forces $F_{Track1}$ and $F_{Track2}$ illustrated in FIG. 10a. These reaction forces $F_{React1}$ and $F_{React2}$ act on the pole pieces 244, 246 positioned over the tracking coils 232, 234, 236, 238 on each side of the lens holder 210. As described above, the magnitude of the tracking forces $F_{Track1}$ and $F_{Track2}$ is equal. Further, the dimensions of the pole pieces 244, 246 are equal, such that the reaction forces $F_{React1}$ and $F_{React2}$ produced are equal. Because the pole pieces 244, 246 are positioned at equal distances $L_R$ from the optical axis O of the lens 122, the moments about the optical axis O are equal in magnitude, reducing rotation about the vertical axis, or yaw. FIG. 11b illustrates the resultant reaction force $F_{React}$ in the vertical plane. As shown, the reaction force $F_{React}$ acts at the center of mass of the fine motor mass $CM_F$, at a distance $L_{RM}$ above the center of mass of the carriage mass $CM_C$, and thus a moment will act on the carriage 106, however, because the distance $L_{RM}$ and the reaction forces $F_{React1}$ and $F_{React2}$ are fairly small, this moment is relatively small and does not significantly affect carriage performance.

Figure 12B:
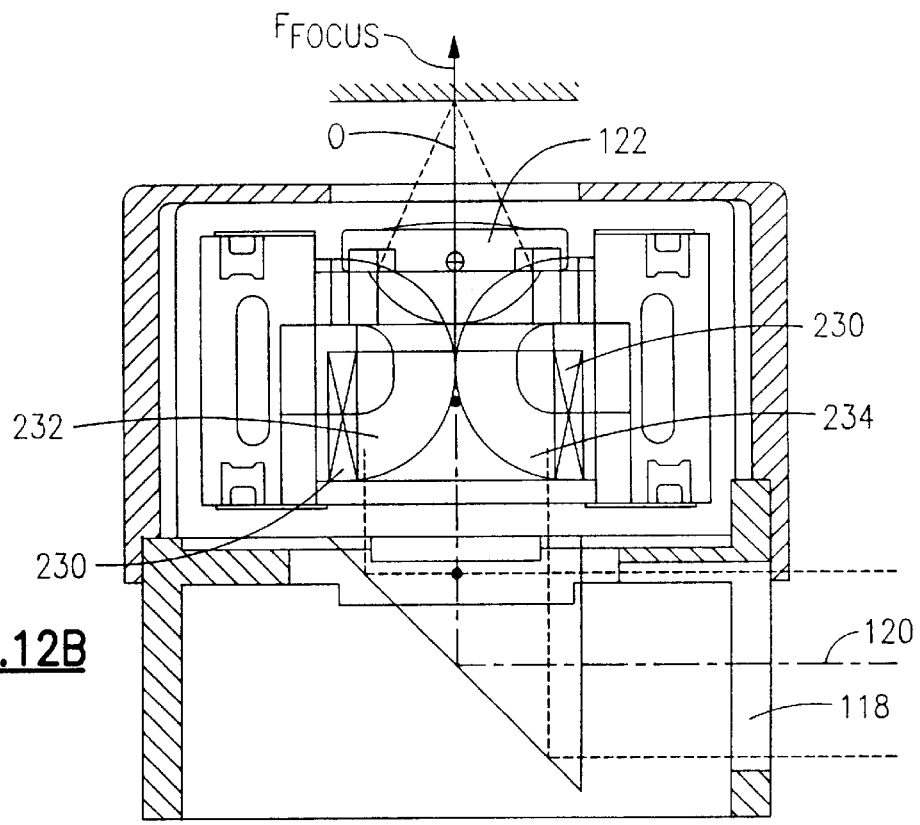
FIG. 12b is a schematic end view of illustrating the alignment of the net focus force with the optical axis of the objective lens.

The resultant focus forces $F_{Focus1}$ and $F_{Focus2}$ acting on the 2-D actuator 116 are illustrated in FIG. 12a. The focus forces $F_{Focus1}$ and $F_{Focus2}$ are centered in the portions of the focus coil 230 located between the tracking coils 232, 234, 236, 238 and pole pieces 244, 246, adjacent the permanent magnets 250, 252. The focus coil 230 is wound within the opening 212 in the lens holder 210 (FIG. 4) such that the same amount of current flows through each side of the coil 230 adjacent the magnets, thus producing equal forces $F_{Focus1}$ and $F_{Focus2}$ at the sides of the lens holder 210 which act to move the lens holder and objective lens 122 carried thereon in a vertical direction. The coil is positioned symmetrically within the opening 212 in the lens holder 210 such that the centers of the forces $F_{Focus1}$ and $F_{Focus2}$ produced are positioned equidistantly at distances $L_F$ from the optical axis O of the objective lens 122. In this configuration, the moments produced about the optical axis O of the lens 122 are equal, reducing roll of the lens holder 210. Additionally, as illustrated in FIG. 12b, when viewed from the end of the carriage, the focus forces $F_{Focus1}$ and $F_{Focus2}$ ($F_{Focus}$ in the drawing) are aligned with the center of mass $CM_C$ of the carriage mass, thereby reducing pitch of the carriage 106.

Figure 13B:
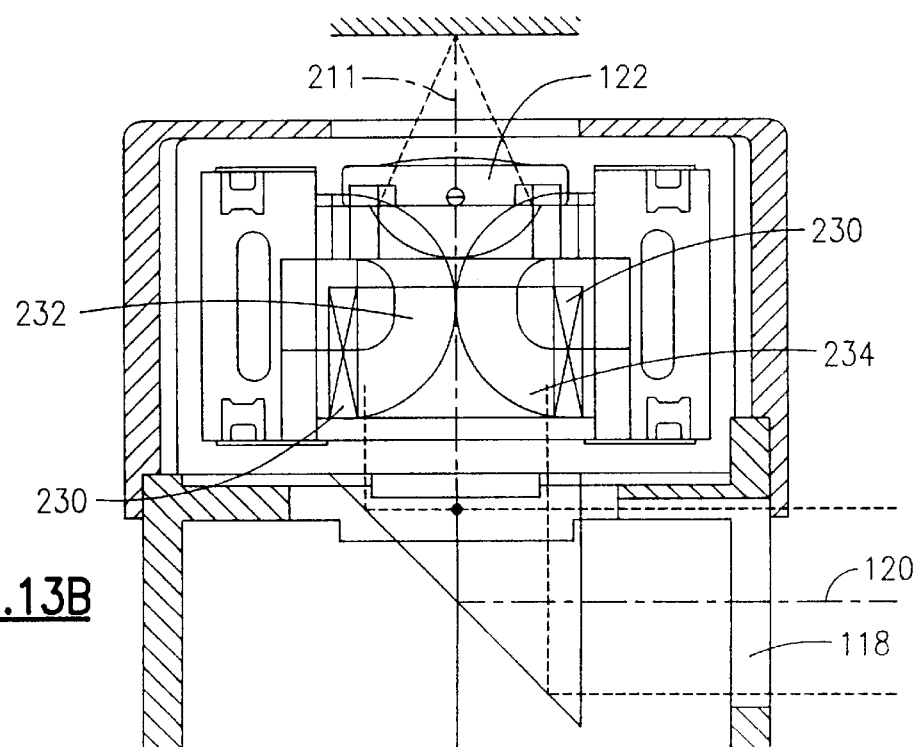
FIG. 13b is a schematic end view which illustrates the alignment of the net focus reaction force with the optical axis of the objective lens.

The reaction forces $F_{FR1}$ and $F_{FR2}$ produced in response to the focus forces $F_{Focus1}$ and $F_{Focus2}$ shown in FIG. 12a are illustrated in the horizontal plane in FIG. 13a. The reaction forces $F_{FR1}$ and $F_{FR2}$ are equal in magnitude and opposite in direction to the focus forces $F_{Focus}$ and $F_{Focus2}$ and are centered adjacent the fine motor permanent magnets 250, 252 intermediate the pole pieces 244, 246. As described above, the focus forces $F_{Focus1}$ and $F_{Focus2}$ are equal, and thus, the reaction forces $F_{FR1}$ and $F_{FR2}$ are equal as well. Further, the reactions forces $F_{FR1}$ and $F_{FR2}$ act at equal distances $L_{FR}$ from the optical axis O of the objective lens 122 to further reduce pitch. Additionally, as illustrated in FIG. 13b, when viewed from the end of the carriage 106, the focus forces $F_{FR1}$ and $F_{FR2}$ ($F_{FR}$ in the drawing) are aligned with the center of mass $CM_C$ of the carriage mass, thereby reducing pitch of the carriage.

Figure 14:
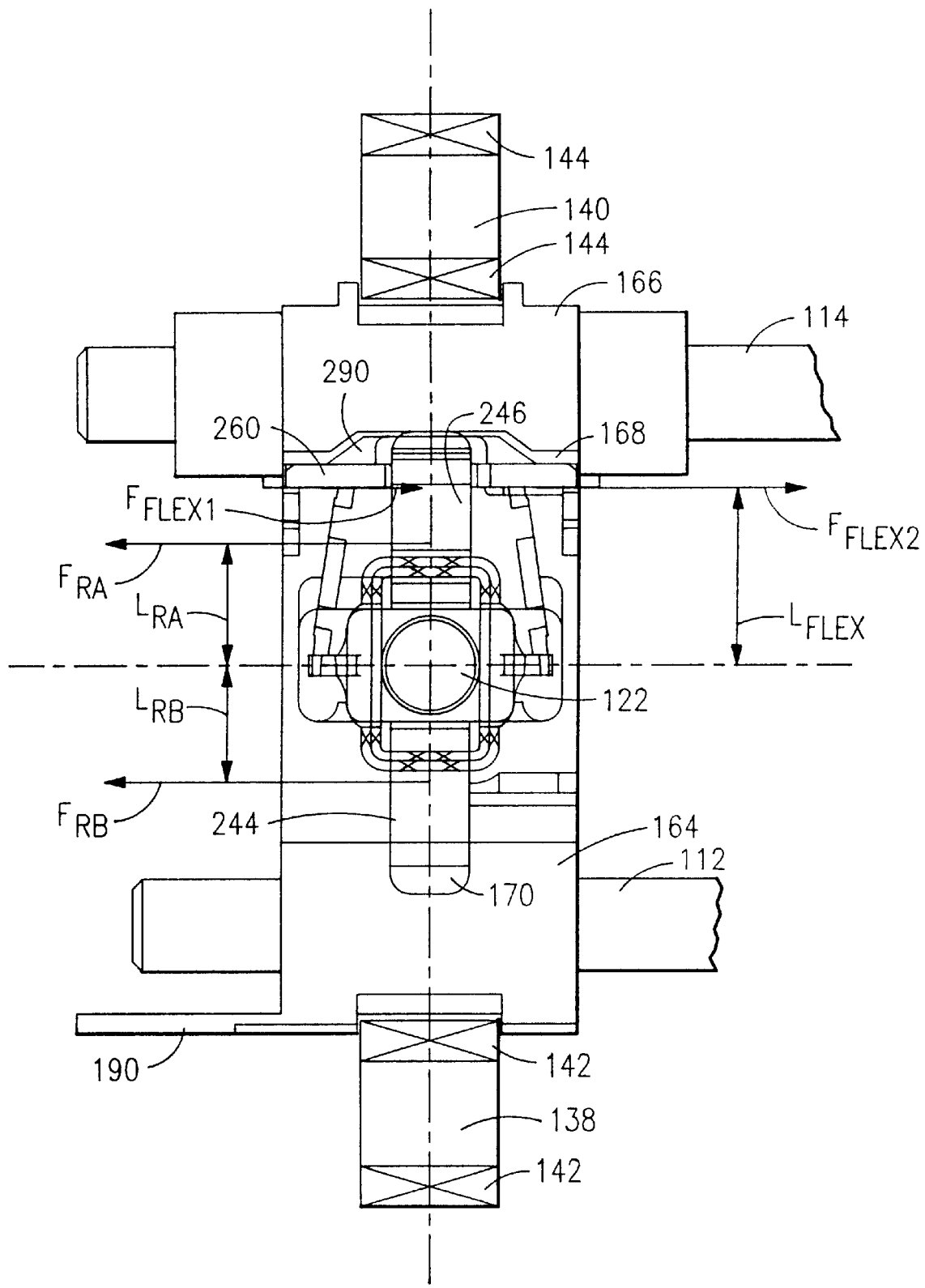
FIG. 14 is a schematic top view illustrating the flexure forces and fine motor reaction forces generated in response to the flexure forces.

The forces $F_{Flex1}$ and $F_{Flex2}$ generated by the flexure arms 260, 262, 264, 266 on the lens holder 210 are illustrated in FIG. 14. The forces $F_{Flex1}$ and $F_{Flex2}$ illustrated are those acting on the upper flexure arms 260, 262, however, those skilled in the art will recognize that identical forces act on the lower flexure arms 264, 268, as well. The forces $F_{Flex1}$ and $F_{Flex2}$ acting on the upper flexure arms 260, 262, respectively, are centered at the crossbar sections 280 of the flexure arms 260, 262 where the flexure arms are attached to the support member 290. As previously described, when these forces $F_{Flex1}$ and $F_{Flex2}$ act on the flexure arms 260, 262, the flexure arms bend in the appropriate direction to achieve fine tracking. To maintain the flexure arms 260, 262 in their bent condition, the fine motor generates reaction forces $F_{RA}$ and $F_{RB}$ which are centered at the pole pieces 244, 246 on either side of the lens holder 210. As shown, the flexure forces $F_{Flex1}$ and $F_{Flex2}$ act a distance $L_{Flex}$ from the optical axis O of the focus lens 122, while the reaction forces $F_{RA}$ and $F_{RB}$ act distances $L_{RA}$ and $L_{RB}$ from the optical axis O, respectively. It will be apparent to those skilled in the art that the moments produced about the optical axis O of the lens 122 by the pairs of forces are not equal, since $(F_{Flex1}+F_{Flex2})$ $L_{Flex}$ does not equal $(F_{RA}L_{RA}+F_{RB}L_{RB})$. However, since these forces are effectively decoupled from the carriage except at very low frequencies (typically below around 40 hz), these forces do not affect actuator performance at most normal operating conditions.

Figure 15B:
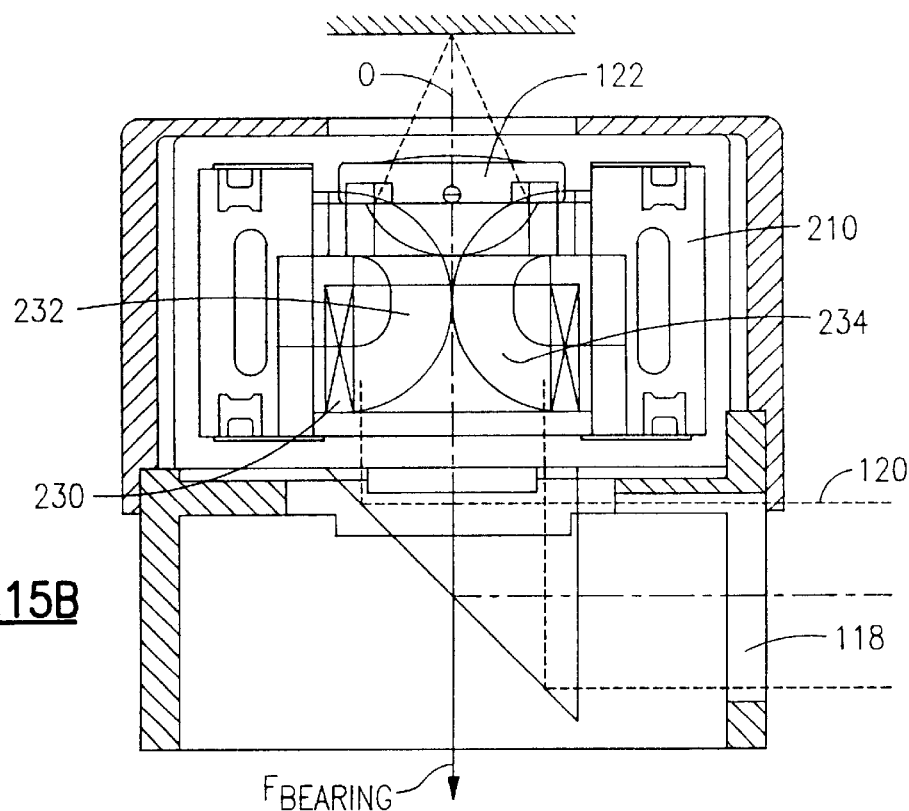
FIG. 15b is a schematic end view illustrating the alignment of the net carriage suspension force with the optical axis of the objective lens.

As described above, the carriage 106 includes two bearing surfaces 108, 110 which are slidably mounted on the guide rails 112, 114 in order to position the carriage 106 beneath various data tracks on the optical disc. In essence, the bearings 108, 110 act as "springs" which hold the carriage 106 above the rails 112, 114. The bearing "spring" stiffness forces $F_{Bearing1}$ and $F_{Bearing2}$ are illustrated in FIG. 15a. The forces $F_{Bearing1}$ and $F_{Bearing2}$ are centered at the point of contact between the bearing surfaces 108, 110 and the rails 112, 114 and extend downwardly through the center of the rails. As described above, the surface contact area between the bearing surface 108 and rail 112 is approximately equal to the surface contact area between the bearing surface 110 and rail 114, and thus these stiffness forces $F_{Bearing1}$ and $F_{Bearing2}$ are substantially equal. Further, the bearing surfaces 108, 110 are positioned at equal distances $L_{Bearing}$ from the optical axis O of the lens 122 so that the moments about the optical axis O produced by these forces $F_{Bearing1}$ and $F_{Bearing2}$ are equal, minimizing carriage pitch. Referring to FIG. 15b, in the vertical plane, the net carriage suspension force $F_{Bearing}$ acts at a point directly between the two bearings and aligned with the optical axis O.

Figure 16A:
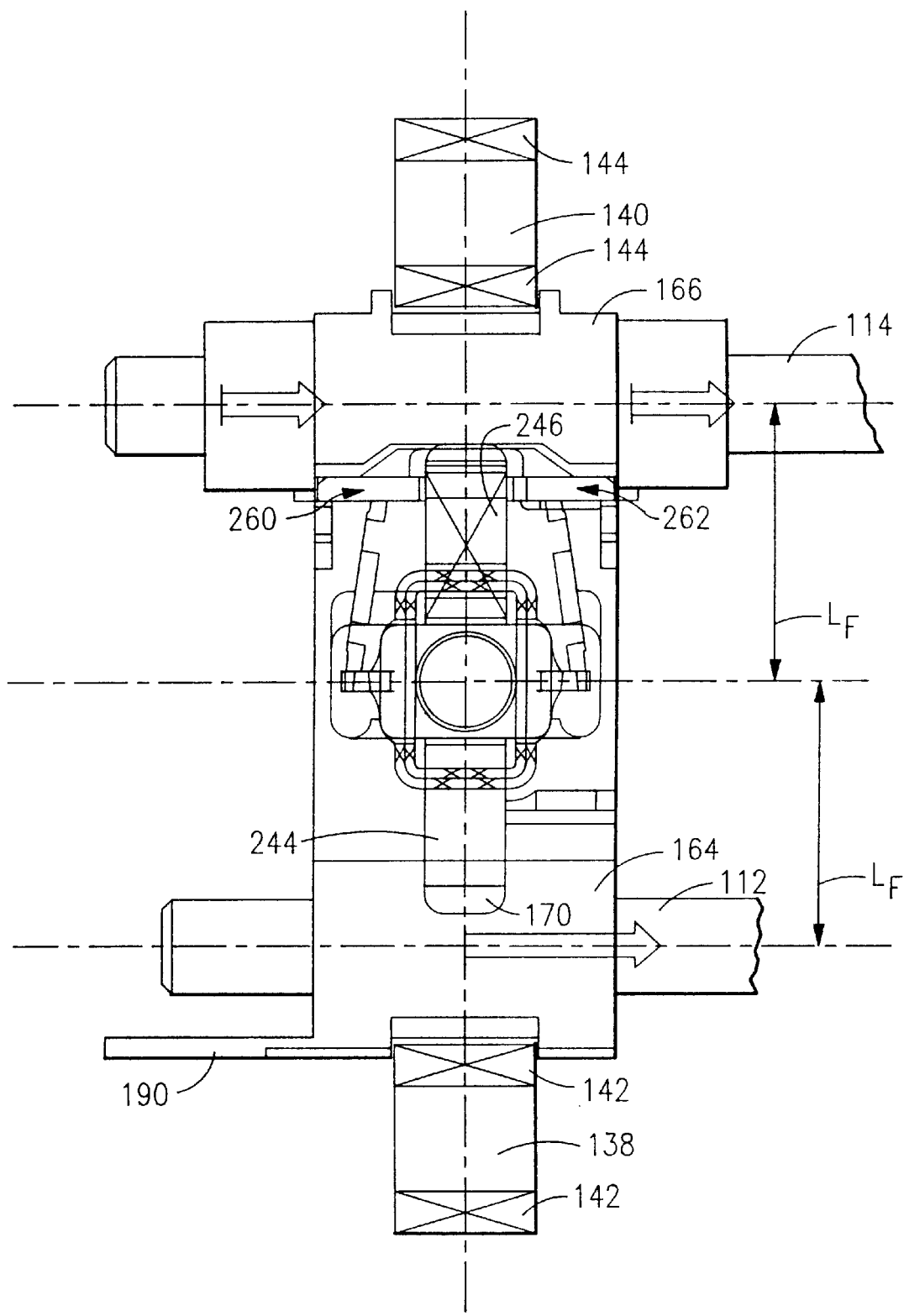
FIG. 16a is a schematic top view which illustrates the symmetry of friction forces in the horizontal plane.

The friction forces $F_{Friction1A}$, $F_{Friction1B}$, and $F_{Friction2}$ acting on the bearing surfaces 108, 110 and rails 112, 114 are illustrated in FIG. 16a. As the first bearing surface 108 comprises two sections 160, 162, two friction forces $F_{Friction1A}$ and $F_{Friction1B}$ are present, one associated with each bearing section 160, 162, respectively, which are centered at the middle of the bearings along the area of contact with the rails 112. A second friction force $F_{Friction2}$ acts on the second bearing surface 110 and is centered in the middle of the bearing along its contact with the rail 114 as shown. Because the area of contact of the bearing sections 160, 162 forming the first bearing surface 108 substantially equals the area of contact of the second bearing surface 110, and the amount of pre-loading and coefficient of friction is the same for both bearing surfaces, the sum of the friction forces $F_{Friction1A}$ and $F_{Friction1B}$ equals the friction force $F_{Friction2}$. The bearing surfaces 112, 114 are located at equal distances $L_F$ from the optical axis O of the focus lens 122, and the resulting moments about the optical axis of the lens are then equal as well. In the vertical plane, the forces $F_{Friction1A}$, $F_{Friction1B}$, and $F_{Friction2}$, act at the areas of contact between the rails 112, 114 and the bearing surfaces 108, 110, as shown in FIG. 16b which are advantageously designed to be horizontally aligned with the center of mass of the carriage mass $CM_C$, such that moments about the center of mass which can produce carriage pitch are reduced.

Figure 17:
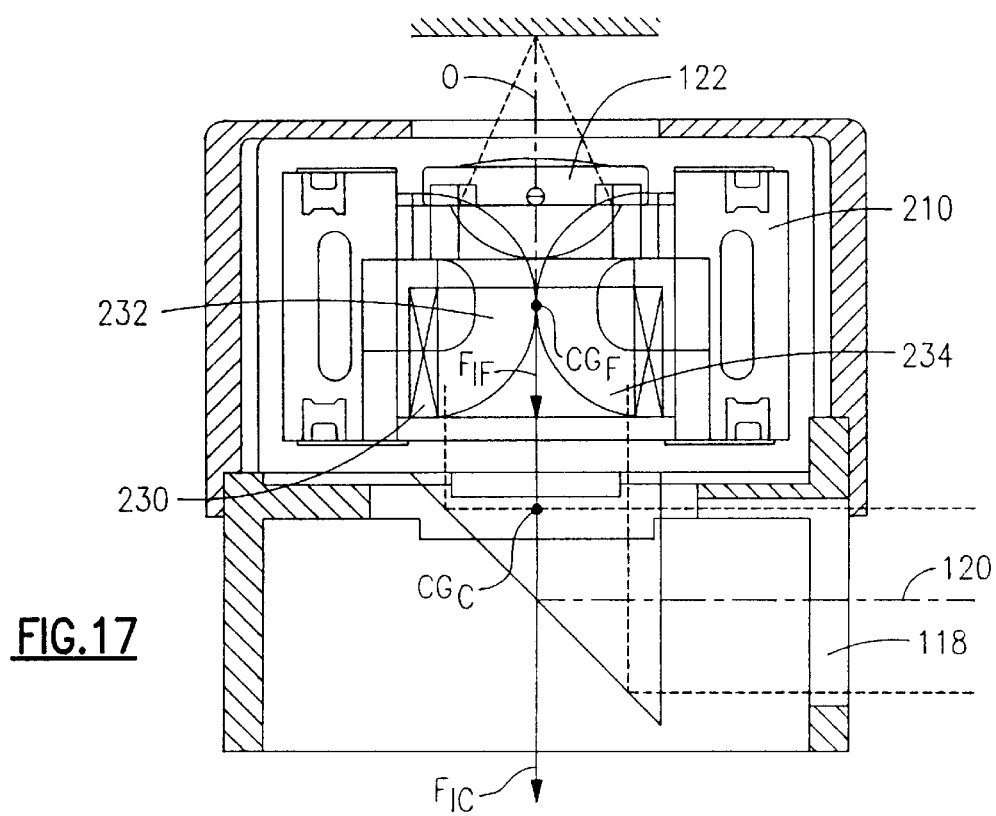
FIG. 17 is a schematic end view which illustrates the net inertial forces acting at the center of mass of the fine motor and center of mass of the carriage in response to a vertical acceleration.

FIGS. 17 through 20 illustrate the inertial forces acting on the carriage 106 and 2-D actuator 116 for both vertical and horizontal accelerations. The inertial forces acting on the fine motor and carriage in response to a vertical acceleration of the assembly are shown in FIG. 17. A first downward inertial force $F_{IF}$ equal to the mass of the fine motor multiplied by the acceleration acts at the center of mass of the fine motor mass $CM_F$. A second downward inertial force $F_{IC}$ acts at the center of mass of the carriage mass $CM_C$ and is equal to the mass of the carriage multiplied by the acceleration. FIGS. 18a and 18b further illustrate that the inertial forces $F_{IF}$ and $F_{IC}$ are horizontally aligned with the optical axis O of the objective lens 122.

Figure 19A:
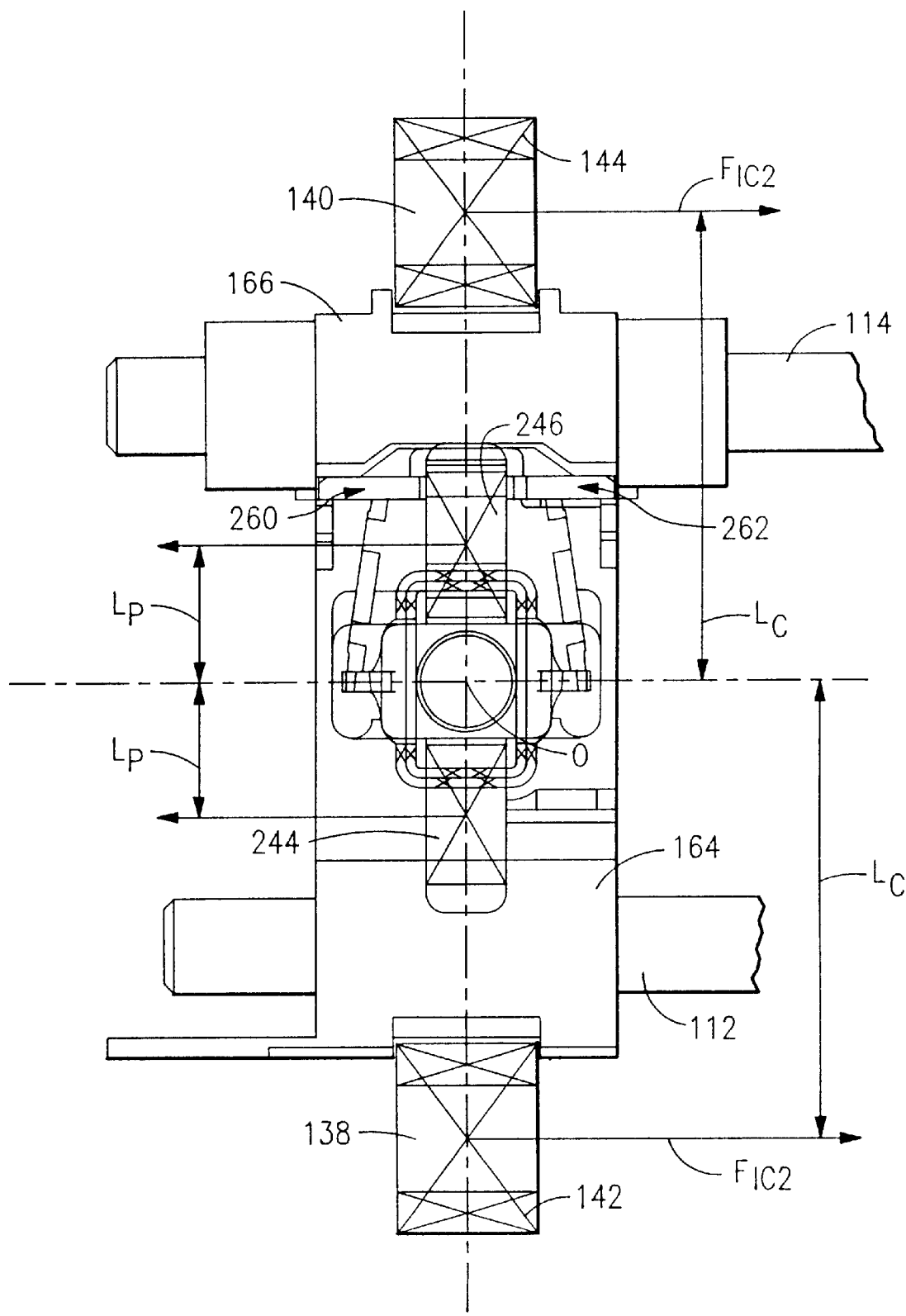
FIG. 19a is a schematic top view which illustrates the inertial forces acting on components of the carriage and actuator assembly for horizontal accelerations.
Figure 19B:
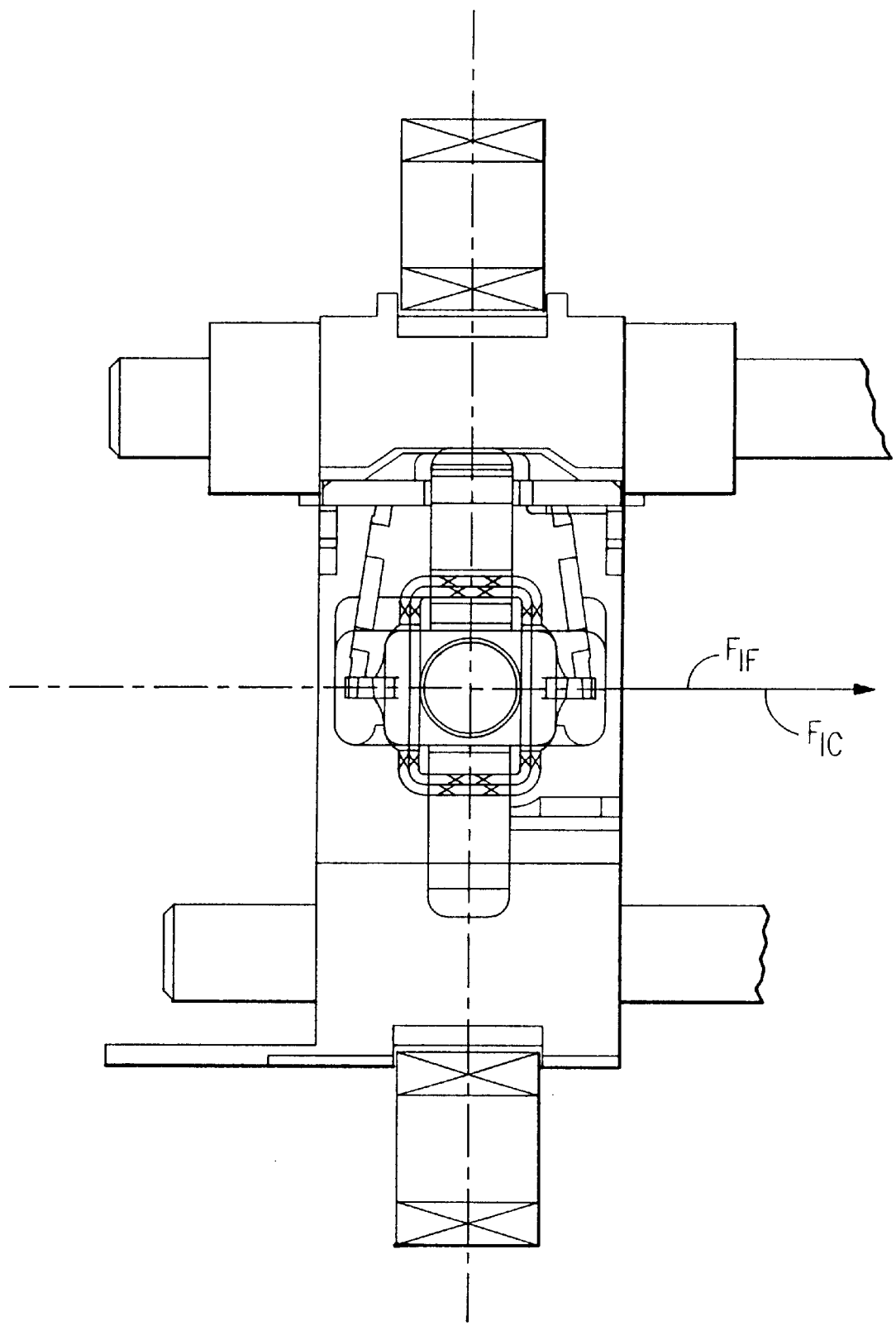
FIG. 19b is a schematic top view illustrating the net inertial forces for horizontal accelerations.

FIG. 19a illustrates the inertial forces acting on the coarse coils 142, 144 and fine motor pole pieces 244, 246 for horizontal accelerations of the carriage and fine motor, respectively. An inertial force $F_{IC1}$ acts at the center of upper portion of the first coarse coil 142 and an inertial force $F_{IC2}$ acts at the center of the upper portion of the second coarse coil 144. As described above, the coils 142, 144 are of identical dimensions, such that the mass of the first coil 142 equals the mass of the second coil 144. The magnitude of each force $F_{IC1}$, $F_{IC2}$ is equal to mass of the respective coil multiplied by the acceleration, and thus, the inertial forces acting on the coils 142, 144 are equal. Because the coils 142, 144 are positioned at equal distances $L_C$ from the optical axis O of the objective lens 122, the resulting moments about the optical axis of the lens produced by the inertial forces $F_{IC1}$ and $F_{IC2}$ are equal. Similarly, because the fine motor pole pieces 244, 246 are of equal dimensions and are located at equal distances $L_P$ from the optical axis O, the inertial forces $F_{IP1}$ and $F_{IP2}$ acting on the pole pieces are equivalent, and the resulting moments about the optical axis O of the objective lens 122 are equal. Applying this same analysis to all other components or "subparts" of the carriage and actuator assembly, and as will be explained in more detail below, the inertial forces produced by horizontal and vertical accelerations above the resonance frequency of the flexure arms are balanced and symmetric with respect to the optical axis O. The net inertial forces of the fine motor and carriage $F_{IF}$ and $F_{IC}$ for acting on the assembly for horizontal accelerations thus act along a line through the center of the carriage which intersects the optical axis O as shown in FIG. 19b. The net inertial force due to the coarse motor $F_{IC}$ is equal to the mass of the coarse motor multiplied by the acceleration, while the net inertial force due to the fine motor $F_{IF}$ is equal to the mass of the fine motor multiplied by the acceleration.

Figure 20A:
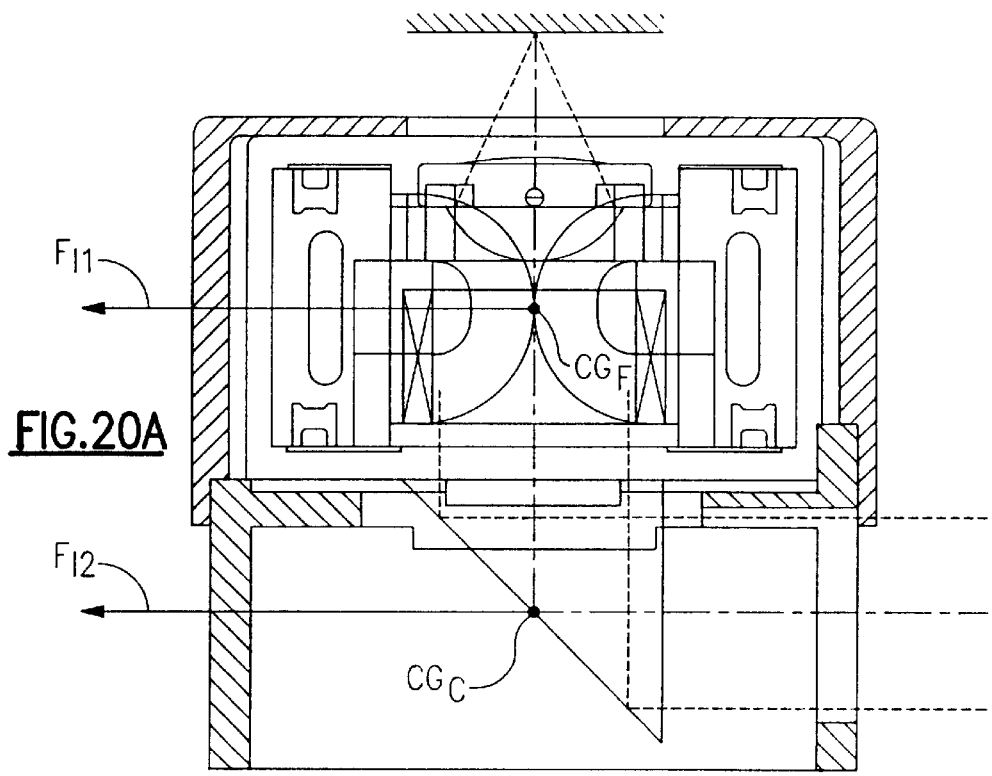
FIG. 20a is a schematic end view which illustrates the fine motor and carriage inertial forces for accelerations above the flexure arm resonance frequency.

At high frequencies, i.e., accelerations in the tracking direction above the lens holder—flexure arm resonance frequency, approximately 40 Hz, components of the assembly 100 decouple and do not affect the position of the objective lens 122. Consequently, the inertial forces differ for accelerations above and below the flexure arm resonance frequency. The inertial forces for horizontal accelerations at these high frequencies are illustrated in FIG. 20a. At these high frequencies, the actuator 116 is decoupled from the carriage 106, such that a first inertial force $F_{I1}$ equal to the mass of the fine motor multiplied by the acceleration acts at the center of mass of the fine motor mass $CM_F$, and a second inertial force $F_{I2}$ equal to the mass of the coarse motor multiplied by the acceleration is centered at the center of mass of the carriage mass $CM_C$.

Figure 20B:
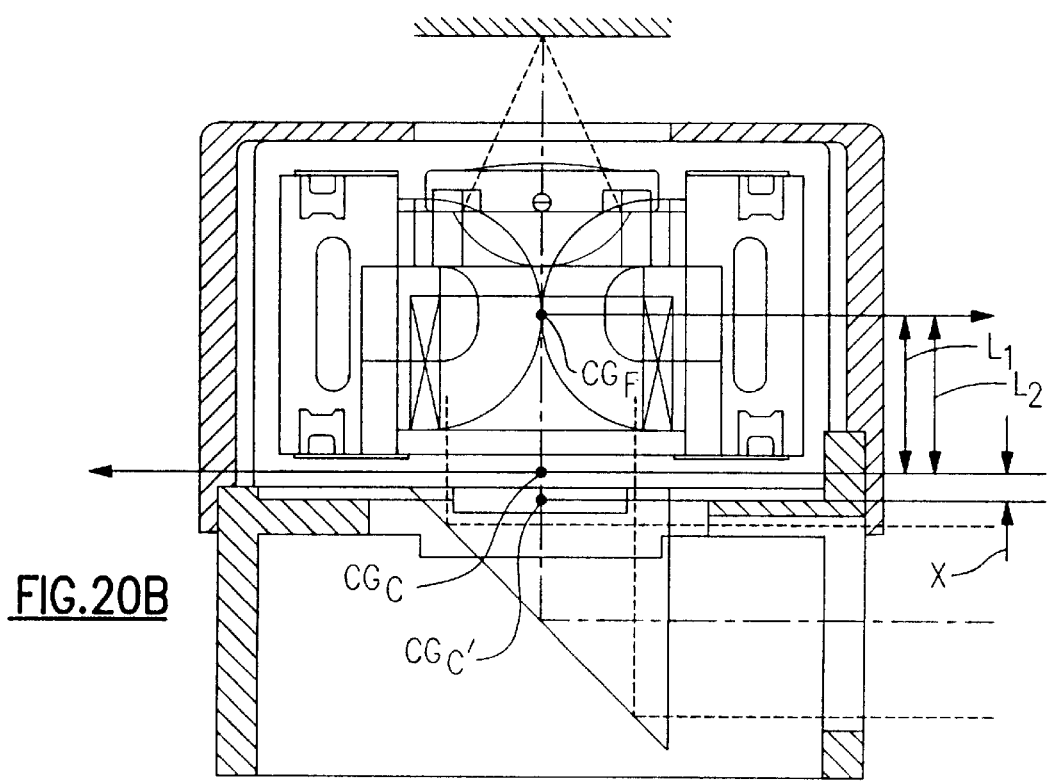
FIG. 20b is a schematic end view which illustrates the fine motor and carriage inertial forces for accelerations below the flexure arm resonance frequency.

FIG. 20b illustrates the inertial forces at horizontal accelerations below the flexure arm resonance frequency. At these lower frequencies, the fine motor mass and carriage mass move as a unit which has a net center of mass at $CM_C'$. As illustrated, this net center of mass $CM_C'$ is located at a distance x vertically above the center of mass of the carriage mass $CM_C$, and thus the coarse motor forces $F_{Coarse1}$ and $F_{Coarse2}$, and the friction forces $F_{Friction1}$ and $F_{Friction2}$, are no longer aligned with the carriage mass center of mass, now shifted to $CM_C'$. Although this vertical shift in the carriage center of mass occurs, the symmetrical design of the assembly 100 ensures that the center of mass of the carriage mass $CM_C$ does not shift in the horizontal plane, and the forces acting on the carriage remain symmetrical about the center of mass and optical axis O in spite of the vertical shift in the center of mass from $CM_C$ to $CM_C'$.

Further, the symmetry of the design ensures that horizontal shifting of the center of mass $CM_C$ does not occur when subparts or components of the carriage decouple at high frequencies. For example, at frequencies in the KHz range, the fine motor poles pieces 244, 246 and magnets 250, 252 will decouple, however, due to the symmetry of the design, the center of mass will not shift in the horizontal plane. Because there is no shift of the center of mass $CM_C$ in the horizontal plane, reaction forces of the focus motor will not pitch or roll the carriage at frequencies above those where subparts have come "loose". Thus, by horizontally aligning the center of mass with the optical axis O of the objective lens 122, the lens sits "in the eye of the storm", where its position is minimally affected by resonance, motor, and reaction forces acting on the assembly 100.

Figure 21A:
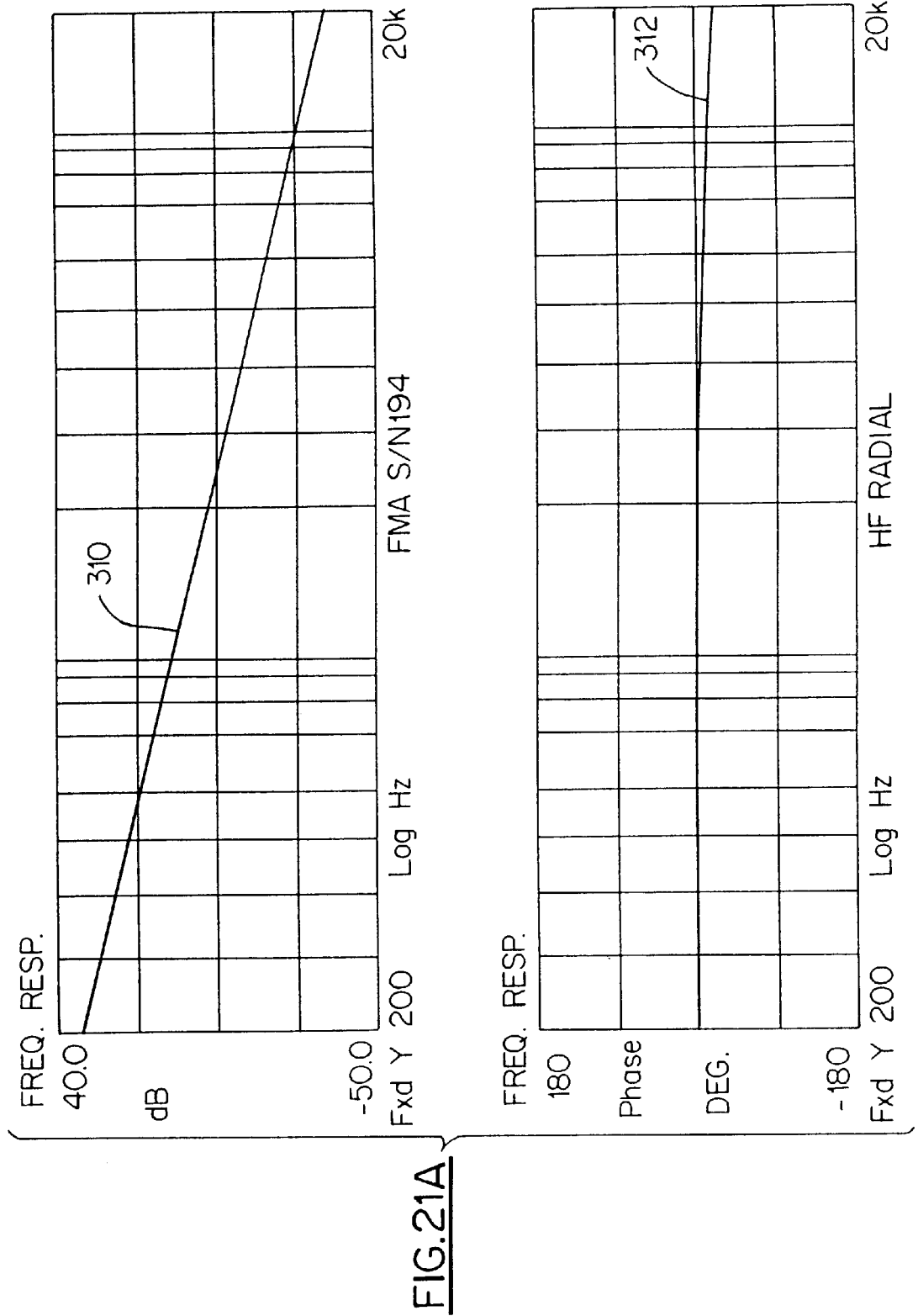
FIGS. 21a–21b are diagrams illustrating the relationship between the fine tracking position versus fine motor current.
Figure 21B:
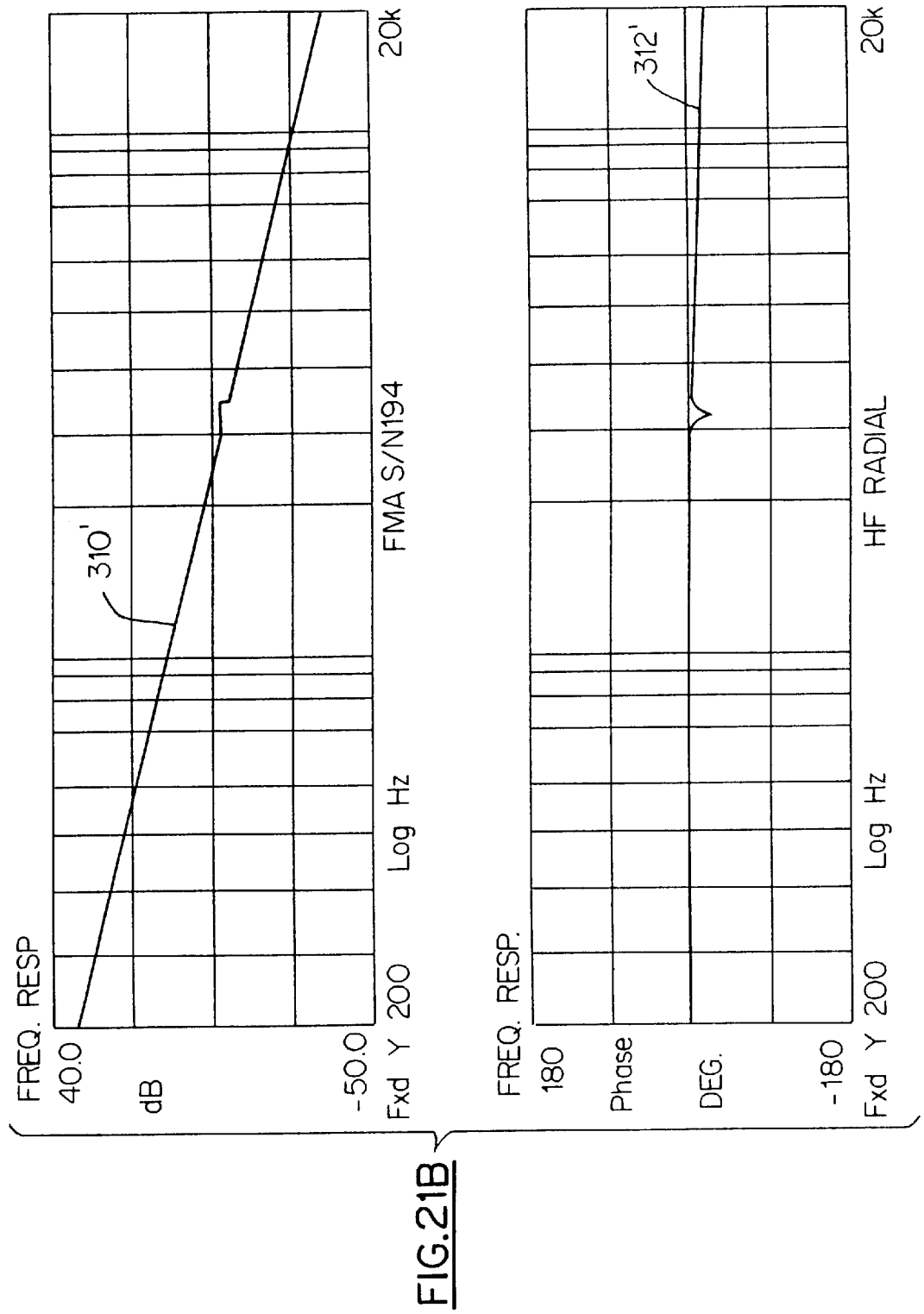

FIG. 21a illustrates the Bode transfer diagram of fine tracking position versus fine motor current of the actuator 116 of the present invention for an objective lens of 0.24 grams suspended in a fine motor having a mass of 1.9 grams. As illustrated, the actuator exhibits almost ideal dB curve having an approximate 40 dB/decade slope and an ideal phase shift curve having a 45 degree phase margin. FIG. 21b illustrates the same transfer function when the lens is off centered in the horizontal or tracking direction by 0.15 mm. Both the dB and phase shift curves reveal a disturbance, or glitch, which occurs at approximately 3.2 kHz. The phase margin decrease to approximately 25 degrees, further reducing loop damping and increasing settling time and overshoot. In terms of lens positioning, the horizontal shift in lens position disturbs the symmetry or balance of the fine tracking forces acting on the lens and results in a moment about the optical axis of the lens, resulting in yaw. Thus, it can be seen that the balancing of forces in the assembly 100 about the optical axis O of the objective lens 122 markedly improves tracking position.

Figure 22A:
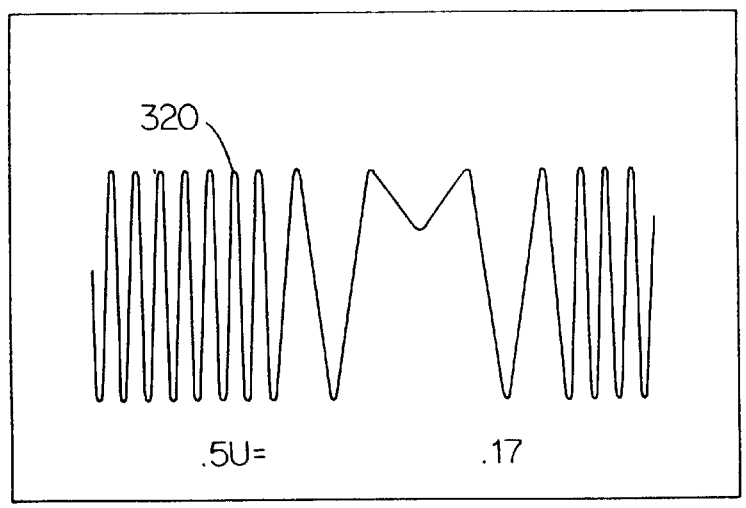
FIGS. 22a–22c illustrate the effects of asymmetrical focus forces acting on the assembly.
Figure 22B:
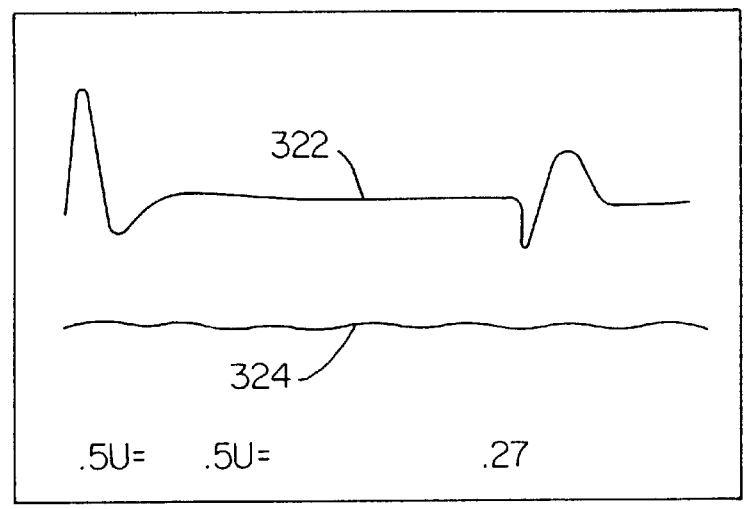
Figure 22C:
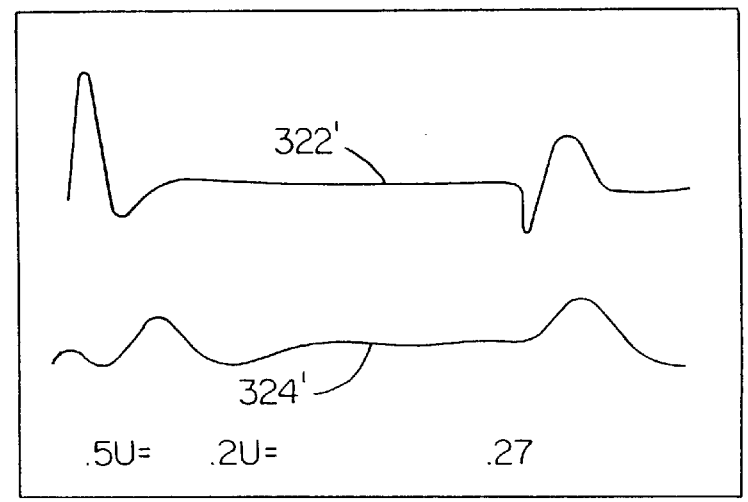

FIG. 22 illustrates the effects of asymmetrical focus forces acting on the assembly 100. FIG. 22a illustrates the tracking signal while crossing tracks for a track pitch of 1.5 um, wherein each sine wave corresponds to an information track on the surface of the optical disc. In FIG. 22b, the focus force is centered with the center of mass of the fine motor $CM_F$ and the optical axis O. The top trace shows the current applied to the focus coil during the step, while the bottom trace shows the tracking error signal while following a particular track, for a focus current of 0.1 Amp, and a focus acceleration of 0.75 m/s$^2$. As illustrated, the tracking error signal remains virtually unaffected by the focus current level. FIG. 22c shows the effect on the current and tracking error signals as in FIG. 22b when the focus force is shifted out of alignment with the optical axis O and center of mass $CM_F$ by approximately 0.2 mm. The tracking signal is now visibly affected by the focus current. With the same focus current and acceleration, a tracking offset of 0.022 um results. Typically, the total allowable track offset in an optical drive is in the range of 0.05 um to 0.1 um, and thus, by aligning the forces as in FIG. 22b, the tracking offset is significantly reduced.

Figure 23:
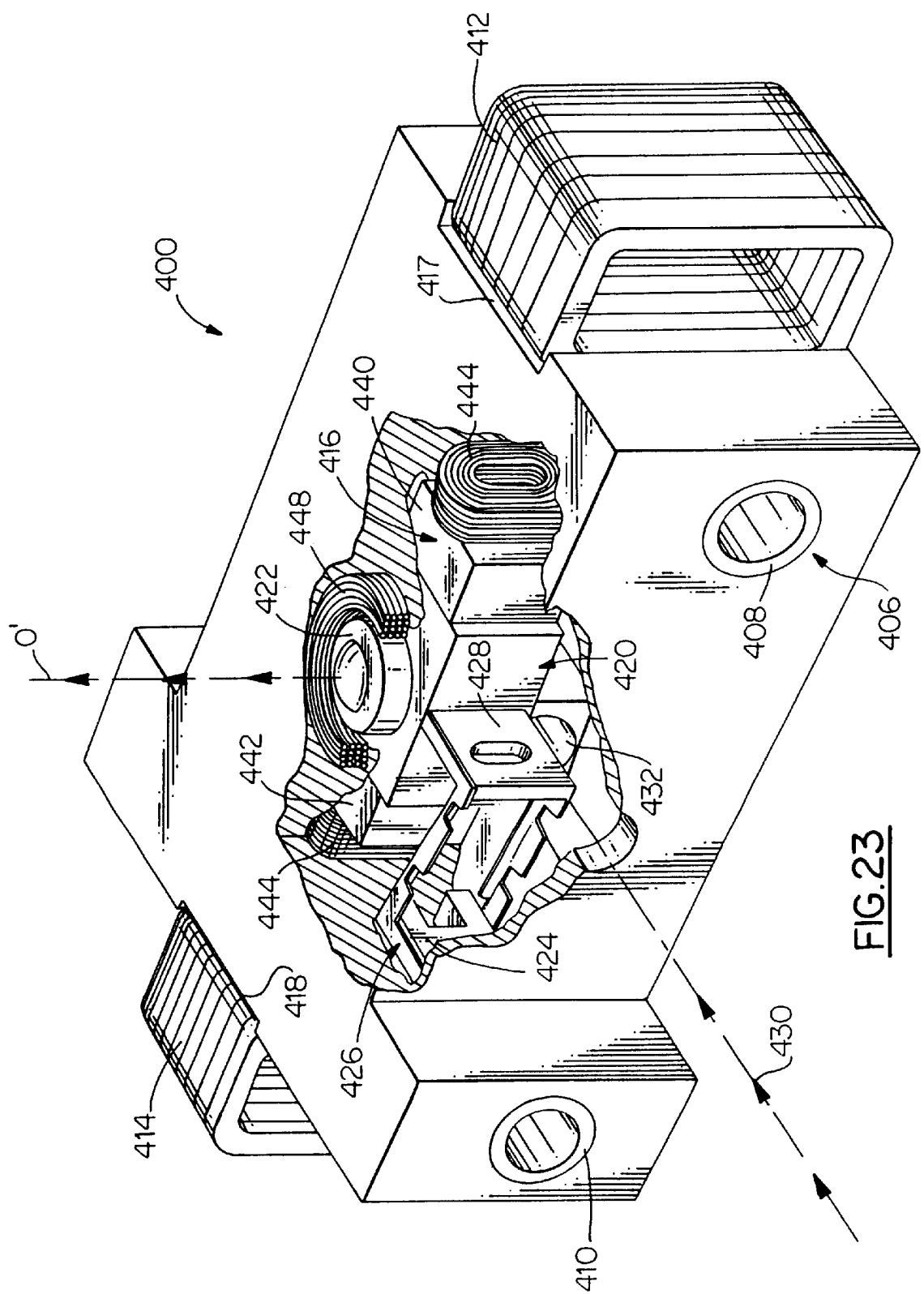
FIG. 23 illustrates an alternative embodiment of a carriage and actuator assembly.

An alternative embodiment of a carriage and actuator assembly 400 in which the center of mass of the 2-D actuator coincides with the center of mass of the carriage mass is illustrated in FIG. 23. In addition to being substantially symmetrical about the optical axis of the objective lens, the center of mass of the fine motor mass coincides with the center of mass of the carriage mass and is aligned with the optical axis. The carriage and actuator assembly 100 of the first embodiment is adequate for most frequency ranges, however, the assembly 400 of the alternative embodiment may be used in applications where it is desirable to avoid the shift in the center of mass of the carriage mass at frequencies below the flexure arm resonance frequency.

The assembly includes a carriage having first and second bearing surfaces substantially identical to those in assembly 100 which can be slidably mounted on guide rails (not shown), and a 2-D actuator which is mounted within the carriage. The carriage includes a pair of coarse tracking coils positioned within notches formed in the carriage, adjacent the bearing surfaces, which act to move the carriage horizontally in a tracking direction to access various information tracks on the surface of an optical disc.

The actuator includes a lens holder having an objective lens mounted thereon. A pair of ledges formed on the top surface of the carriage support a pair of top flexure arms which are further attached to the top surfaces of a pair of projections formed on the lens holder. A pair of bottom flexure arms which are identical in structure to the top flexure arms are supported by corresponding ledges in the bottom of the carriage (not shown), and attach to the bottom surfaces of the projections on the lens holder. A beam of light enters the actuator through a oval aperture and is reflected by a mirror contained inside the actuator through the objective lens along an optical axis O'. The actuator is further attached to a focus and fine tracking motor which moves the lens so as to precisely align and focus the exiting beam upon a desired location on the surface of the optical disc. The focus and fine tracking motor includes two permanent magnets affixed to opposing ends of the lens holder. An oval-shaped fine tracking coil is affixed to each permanent magnet, adjacent the carriage bearings. Two focus coils are attached to the top and bottom surfaces of the carriage and supported by ledges formed within the interior of the carriage such that the lens holder is positioned between the focus coils.

Coarse tracking movement of the carriage and actuator is effected in a manner identical to that of the assembly 100 illustrated in FIGS. 6 and 7. When a current is applied to the coarse tracking coils in the presence of a magnetic field, a force is generated according to Lorentz law which acts to move the carriage and actuator in a tracking directions so as to position the objective lens beneath various information tracks on the optical disc.

Figure 24:
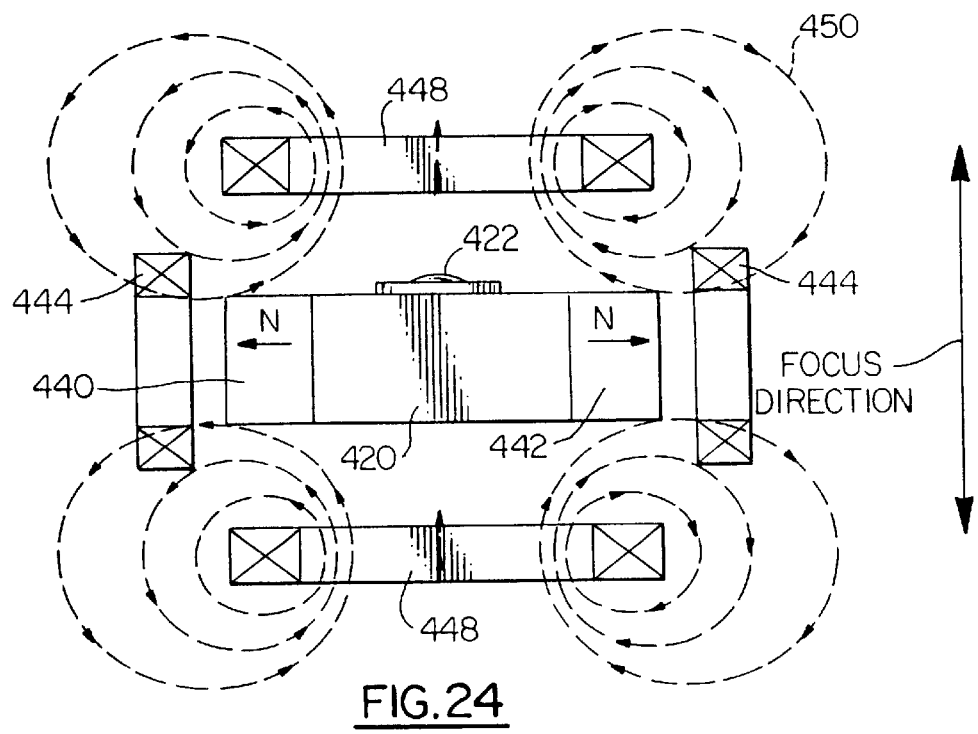
FIG. 24 illustraes the operation of the actuator to move the lens holder in a tracking direction.

FIG. 24 illustrates the operation of the actuator to move the lens holder and objective lens carried thereon in a focussing direction. When a current is generated in the focus coils, an electromagnetic field is induced in each of the coils. This electromagnetic field differs in direction for the respective focussing coils as shown. In the example shown, both permanent magnets will be attracted by the bottom focus coil and repelled by the top focus coil, thus moving the objective lens holder toward the bottom focus coil and away from the top focus coil to position the objective lens farther away from the surface of the optical disc, wherein the magnitude of the displacement depends on the strength of the induced electromagnetic field.

Figure 25:
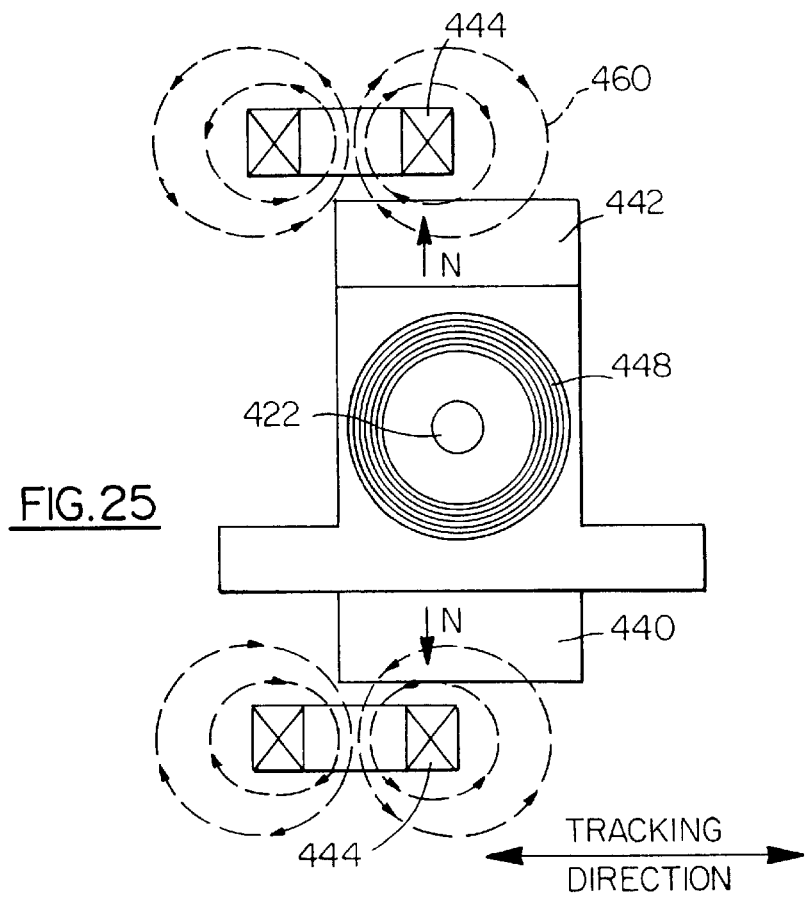
FIG. 25 illustrates the operation of the actuator to move the lens holder in a tracking direction.

In a similar manner, FIG. 25 illustrates the permanent magnets interacting with the fine tracking coils. Energization of the tracking coils moves the lens holder horizontally in the tracking direction to the right or to the left depending upon the direction of current through the coils. For example, in the presence of the magnetic field illustrated, the lens holder and objective lens are moved towards the left. In this manner, the fine tracking coils act to more precisely position the light beam exiting the objective lens within the center of a desired information track on the optical disc.

As described above, the coarse tracking motor operates in a manner identical to that of the coarse tracking motor in the assembly 100. The coarse tracking coils are of identical dimensions and are positioned at equal distances from the optical axis O' of the objective lens. Equal currents are applied to the coils such that forces $F_{Coarse1}'$ and $F_{Coarse2}'$ acting on the carriage act at equal distances $L_{C1}'$ and $L_{C2}'$ from the optical axis O'. In the vertical plane, in the radial direction, these forces $F_{Coarse1}'$ and $F_{Coarse2}'$ are aligned with the coincident centers of gravity of the fine motor mass $CM_F'$ and carriage mass $CM_C'$, thereby minimizing carriage and actuator pitch. In a similar manner, the bearing surfaces are positioned at equal distances from the optical axis O' such that the carriage suspension forces are also symmetric about the optical axis O'. Each force $F_{Bearing1}$ and $F_{Bearing2}$ acts an equal distance $L_{Bearing}'$ from the optical axis O' such that the moments produced about the optical axis are equal and carriage and actuator pitch is further reduced. The surface area of the bearings which contacts the rails is designed to be substantially equal such that the friction forces acting on the carriage are substantially equal. Since the bearing surfaces are positioned equidistantly from the optical axis O', the moments acting about the optical axis are equal and and actuator is minimized. The assembly is further designed such that the friction forces are vertically aligned with the center of mass of the carriage and actuator.

The fine tracking coils are of equal dimensions and the current applied to the coils is equal such that the fine tracking forces acting on the actuator are equal. Further, the fine tracking coils are positioned at equal distances $L_T'$ from the optical axis O' such that the moments produced about this axis are equal. In the vertical plane, these forces $F_{Track1}'$ and $F_{Track2}'$ are also aligned with the centers of gravity of the actuator and carriage, such that pitch of the actuator is reduced. Since the fine tracking forces acting on the assembly are equal, it follows that the reaction forces $F_{React1}'$ and $F_{React2}'$ produced in response to the tracking forces $F_{Track1}'$ and $F_{Track2}'$ are equal as well. These reaction forces act at equal distances $L_R'$ from the optical axis and are vertically aligned with the centers of gravity, such that moments about the optical axis are equal and yaw is reduced.

In a similar manner, the focus coils have substantially equal dimensions and current applied to them such that the focus coils produce equal forces $F_{Focus1}'$ and $F_{Focus2}'$ acting on the actuator. However, in this embodiment, the focus coils are located at equal distances $L_F'$ from the coincident centers of gravity of the fine motor mass and carriage mass such that the moments about the optical axis O' are equal. Further, because the focus forces $F_{Focus1}'$ and $F_{Focus2}'$ are equal, the focus reaction forces $F_{FR1}'$ and $F_{FR2}'$ acting on the fine motor mass are equal and act at equal distances $L_{FR}'$ from the coincident centers of gravity of the carriage mass $CM_C'$ and fine motor mass $CM_F'$. Thus, moments produced by the reaction forces about the optical axis are equal and actuator pitch is further minimized.

The flexure forces $F_{Flex1}'$, $F_{Flex2}'$, acting on the actuator and fine motor reaction forces $F_{RA}'$, $F_{RB}'$, produced in response to the flexure forces are effectively the same as those illustrated in FIG. 14 for the assembly 100. Because the flexure and reactions forces are not symmetrical about the optical axis O', the moments produced by these pairs of forces about the axis O' are not equal, however, these forces are effectively decoupled from the carriage except at low frequencies (typically below around 40 Hz), such that these moments do not affect actuator performance under most operating conditions.

Thus, the motor and reaction forces acting on the assembly 400 are symmetric about the optical axis O' and are vertically in alignment with the centers of gravity of the fine motor mass $CM_F'$ and carriage mass $CM_C'$. Because the centers of gravity of the fine motor mass and carriage mass coincide, decoupling of the actuator or any of the subparts of the assembly will not shift the center of mass, and the forces and moments acting on the assembly will remain balanced for virtually all horizontal and vertical accelerations.

We claim:

1. An apparatus for controlling the position of a lens, the apparatus comprising:
   a carriage having a center of mass;
   an actuator having a center of mass, the actuator being suspended from the carriage at an initial position, and movable relative to the carriage;
   a lens disposed in the actuator, the lens defining an optical axis that substantially intersects the center of mass of the actuator and the center of mass of the carriage, suspensory forces acting on the actuator thereby being symmetric about the optical axis; and
   a focusing drive for the actuator, the focusing drive producing a plurality of focusing forces that are balanced and symmetric about the optical axis to displace the actuator relative to the carriage in a focusing direction so that movement produced by the plurality of focusing forces about the center of mass of the actuator is effectively absent, and forces reactive to the plurality of focusing forces are balanced and symmetric with respect to the optical axis to thereby produce only insubstantial movement about the center of mass of the actuator so that inertial forces acting on the actuator are balanced and symmetric about the optical axis.

2. The apparatus of claim 1 further comprising a tracking drive for the actuator, the tracking drive producing a plurality of tracking forces that are balanced and symmetric about the optical axis to accelerate the actuator relative to the carriage at different frequencies in a tracking direction so that movement produced by the plurality of tracking forces about the center of mass of the actuator is effectively absent, and forces reactive to the plurality of tracking forces are effectively balanced and symmetric with respect to the optical axis so that inertial forces acting on the actuator are balanced and symmetric about the optical axis to thereby produce only insubstantial movement about the center of mass of the actuator so that inertial forces acting on the actuator are balanced and symmetric about the optical axis.

3. The apparatus of claim 1 further comprising a tracking drive for the actuator, the tracking drive producing a plurality of tracking forces that are balanced and symmetric about the optical axis to accelerate the actuator relative to the carriage at different frequencies exceeding about 40 Hz in a tracking direction so that movement produced by the plurality of tracking forces about the center of mass of the actuator is effectively absent, and forces reactive to the plurality of tracking forces are effectively balanced and symmetric with respect to the optical axis so that inertial forces acting on the actuator are balanced and symmetric about the optical axis.

4. The apparatus of claim 1 further comprising a tracking drive for the actuator, the tracking drive producing a plurality of tracking forces that are balanced and symmetric about the optical axis to displace the actuator relative to the carriage in a tracking direction, movement produced by the plurality of tracking forces about the optical axis thereby being effectively absent, and forces reactive to the plurality of tracking forces being effectively balanced and symmetric with respect to the optical axis so that inertial forces acting on the actuator are balanced and symmetric about the optical axis.

5. The apparatus of claim 1 further comprising a tracking drive for the actuator, the tracking drive producing a plurality of balanced tracking forces symmetric about the optical axis to accelerate the actuator relative to the carriage at different frequencies in a tracking direction, movement produced by the plurality of tracking forces about the optical axis thereby being effectively absent, and forces reactive to the plurality of tracking forces being effectively balanced and symmetric with respect to the optical axis so that inertial forces acting on the actuator are balanced and symmetric about the optical axis.

6. The apparatus of claim 1 wherein the tracking drive is a fine tracking drive.

7. The apparatus of claim 1 wherein the carriage further includes a plurality of flexure arms that attach to the actuator for suspension thereof.

8. The apparatus of claim 7 wherein the flexure arms each include a horizontal section that flexes in a generally vertical direction and a vertical section that flexes in a generally horizontal direction.

9. The apparatus of claim 8 wherein the flexure arms have a thickness of approximately from 25 micrometers to 75 micrometers; and the horizontal sections and the vertical sections are symmetrically arranged about a plurality of lines of symmetry that pass orthogonally through the optical axis.

10. The apparatus of claim 8 wherein the flexure arms are fabricated of sheet metal.

11. The apparatus of claim 1 further comprising a position sensor for generating a position correction signal, the position correction signal indicating an amount of displacement of the actuator from the initial position.

12. The apparatus of claim 11 wherein the position correction signal is utilized for precise placement of the lens at a desired location.

13. The apparatus of claim 11 wherein the actuator is displaced relative to the carriage in the focusing direction.

14. The apparatus of claim 13 wherein the position correction signal is related to displacement of the actuator in the focusing direction.

15. The apparatus of claim 1 wherein the center of mass of the carriage and the center of mass of the actuator are coincident.

16. An apparatus for controlling the position of a lens, comprising:
   a carriage having a center of mass;
   an actuator having a center of mass, the actuator being suspended from the carriage at an initial position, and movable relative to the carriage;
   a lens disposed in the actuator, the lens defining an optical axis that substantially intersects the center of mass of the actuator and the center of mass of the carriage, suspensory forces acting on the actuator thereby being symmetric about the optical axis; and
   a tracking drive for the actuator, the tracking drive producing a plurality of tracking forces that are balanced and symmetric about the optical axis to displace the actuator relative to the carriage in a tracking direction so that movement produced by the plurality of tracking forces about the center of mass of the actuator is effectively absent, and forces reactive to the plurality of tracking forces are effectively balanced and symmetric with respect to the optical axis to thereby produce only insubstantial movement about the center of mass of the actuator so that inertial forces acting on the actuator are balanced and symmetric about the optical axis.

17. The apparatus of claim 16 further comprising a focusing drive for the actuator, the focusing drive producing a plurality of focusing forces that are balanced and symmetric about the optical axis to displace the actuator relative to the carriage in a focusing direction so that movement produced by the plurality of focusing forces about the center of mass of the actuator is effectively absent, and forces reactive to the plurality of focusing forces are balanced and symmetric with respect to the optical axis to thereby produce only insubstantial movement about the center of mass of the actuator so that inertial forces acting on the actuator are balanced and symmetric about the optical axis.

18. The apparatus of claim 17 further comprising a position sensor for generating a position correction signal, the position correction signal indicating an amount of displacement of the actuator from the initial position.

19. The apparatus of claim 18 wherein the position correction signal is related to displacement of the actuator in the focusing direction and the tracking direction.

20. The apparatus of claim 16 further comprising a focusing drive for the actuator, the focusing drive producing a plurality of focusing forces that are balanced and symmetric about the optical axis to accelerate the actuator relative to the carriage at different frequencies in a focusing direction so that movement produced by the plurality of focusing forces about the center of mass of the actuator is effectively absent, and forces reactive to the plurality of focusing forces are balanced and symmetric with respect to the optical axis to produce only insubstantial movement about the center of mass of the actuator so that inertial forces acting on the actuator are balanced and symmetric about the optical axis.

21. The apparatus of claim 15 further comprising a position sensor for generating a position correction signal, the position correction signal related to an amount of displacement of the actuator from the initial position.

22. The apparatus of claim 21 wherein the position correction signal is utilized for precise placement of the tons at a desired location.

23. The apparatus of claim 21 wherein the actuator is displaced relative to the carriage in the tracking direction.

24. The apparatus of claim 21 wherein the position correction signal is related to displacement of the actuator in the tracking direction.

* * * * *

UNITED STATES PATENT AND TRADEMARK OFFICE
CERTIFICATE OF CORRECTION

PATENT NO. : 6,532,199 B1
DATED : March 11, 2003
INVENTOR(S) : Getreuer et al.

It is certified that error appears in the above-identified patent and that said Letters Patent is hereby corrected as shown below:

Title page,
Item [56], References Cited, OTHER PUBLICATIONS, "Harrison et al.,", reference, delete "5-114" and insert in place thereof -- 5-1/4 -- after "Doubly Supported" and before "Disc Drive Spindles", Precision"

Column 20,
Line 12, delete "15" and insert in place thereof -- 16 -- after "The apparatus of claim" and before "further comprising a"
Line 17, delete "tons" and insert in place thereof -- lens -- after "correction signal is utilized for precise placement of the" and before "at a desired location."

Signed and Sealed this

Twenty-seventh Day of April, 2004

JON W. DUDAS
*Acting Director of the United States Patent and Trademark Office*